United States Patent [19]

Williams

[11] 3,731,311

[45] May 1, 1973

[54] POLYPHASE ENCODING-DECODING SYSTEM

[75] Inventor: Frederick C. Williams, Topanga, Calif.

[73] Assignee: Hughes Aircraft Company, Culver City, Calif.

[22] Filed: Sept. 18, 1970

[21] Appl. No.: 73,470

[52] U.S. Cl. ..........................343/17.2 PC, 343/5 DP

[51] Int. Cl. ..............................................G01s 17/32

[58] Field of Search ..................235/181; 343/17.2 R, 343/17.2 PC, 5 DP, 100 CL

[56] References Cited

UNITED STATES PATENTS 3,096,482 7/1963 Frank et al. ....................343/100 CL

OTHER PUBLICATIONS

Lurin, Ely S., Proceedings of the IEEE, Correspondence, Digital Pulse Compression Using Polyphase Code, Sept. 1963, pp. 1262–1263

*Primary Examiner*—Stephen C. Bentley

*Attorney*—James K. Haskell and Lawrence V. Link, Jr.

[57] ABSTRACT

A polyphase pulse compression system for simultaneously decoding and amplitude weighting groups of sequentially applied phase encoded signals. For a phase encoded signal group of $N^2$ signal elements the decoded amplitude weighted value of a particular signal group is formed by modifying only N stored sub-accumulation signals from the preceding decoding cycle. Dual processing storage channels associated with each sub-accumulation signal are alternately cleared to reduce processor error "build-up."

26 Claims, 22 Drawing Figures

United States Patent [19]
Williams
[11] 3,731,311
[45] May 1, 1973
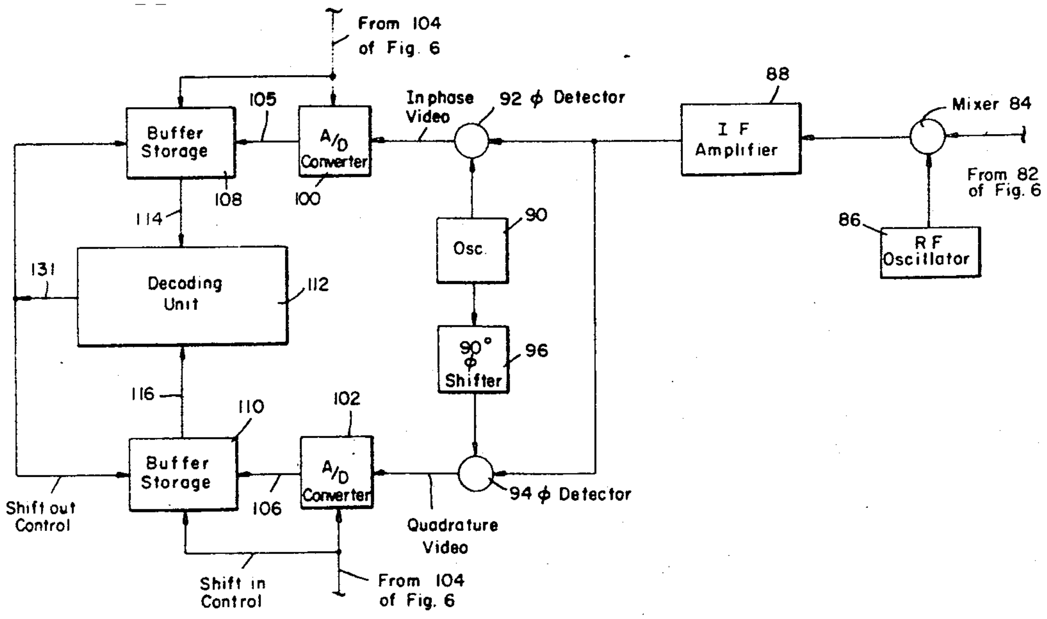

Patented May 1, 1973

3,731,311

11 Sheets-Sheet 1

Frederick C. Williams,
INVENTOR.
BY.

Lawrence V. Link Jr.
ATTORNEY.

Patented May 1, 1973

3,731,311

11 Sheets-Sheet 11

POLYPHASE ENCODING-DECODING SYSTEM

BACKGROUND OF THE INVENTION

This invention relates generally to encoding and decoding systems and more particularly to an improved digital system of reduced complexity and increased accuracy for decoding and amplitude weighting sequences of polyphase encoded signals.

In applications such as radar mapping and ranging, it is theoretically possible to achieve any desired range resolution by transmitting a sufficiently narrow pulse of energy and then processing the received energy in a receiver unit of suitable bandwidth. Following this approach, as the pulsewidth decreases the peak power of the transmitted signal must be increased if a given range capability is to be maintained. For many applications the combined range and range resolution requirements would require a narrow pulse of such peak power as to exceed the current state of the pulse transmission art.

The above-described problem prompted the development of pulse compression techniques wherein a fairly long (time duration) low peak power encoded pulse is transmitted, and on reception the received signal is decoded (time compressed). Numerous analog techniques for pulse compression have been developed such as those using tapped delay lines or dispersive delay devices. These analog systems although exhibiting various degrees of effectiveness have all suffered from the common shortcomings of analog mechanizations, i.e., stability, size, weight, power and cost disadvantages as contrasted to their digital counterparts.

A recently developed digital polyphase decoding system described in application Ser. No. 73,471, filed Sept. 18, 1970, entitled "A Polyphase Code System" by Sung Y. Wong, assigned to the assignee hereof and which utilizes an iterative processing technique has the capability of greatly reducing the number of arithmetic operations required for digital decoding. Therefore digital polyphase decoder systems are now becoming economically attractive for radar ranging and mapping applications wherein the signals from a great many range intervals are processed each transmission period. The performance of this type of digital decoding system would be substantially improved if amplitude weighting of the individual encoded signals could be performed during the decoding process and if error build-up (e.g., the accumulation of errors due to inexact values of digital multipliers) could be reduced for long sequences of encoded signal groups.

SUMMARY OF THE INVENTION

It is therefore an object of the invention to provide a polyphase pulse compression system of improved accuracy and reduced equipment complexity.

Another object is to provide a digital system of reduced complexity for sequentially decoding and amplitude weighting a plurality of groups of polyphase encoded signals.

Still another object is to provide a digital decoding unit which substantially reduces error accumulations within the decoding unit.

Yet another object is to provide an improved digital decoding unit which is adapted for processing encoded received radar signals in a sequential manner to provide improved range resolution with a reduction in equipment complexity.

Briefly described, the subject invention includes the apparatus and method for digitally decoding and amplitude weighting groups of signals encoded according to a polyphase code of N phase states with each encoded group comprising $N^2$ signal elements. The decoding unit has N subsections with each subsection providing an output signal (sub-accumulation signal) representative of the sum of N phase rotated and amplitude weighted encoded signals. The sum of the N subaccumulation signals produced during a particular processing time period approximates the decoded amplitude weighted value of the signal group associated therewith.

In one preferred embodiment of the subject invention, each of the N subsections includes digital circuits for vectorially (both inphase and quadrature components of the signals are processed) adding a new amplitude weighted signal to and subtracting a previous entry from each of the N sub-accumulation signals associated with the last decoded signal group. Means are provided for storing the sub-accumulation signals, and each subsection further includes complex multiplier units for forming the vector product of the stored sub-accumulation signal and a preselected vector multiplier value. In this manner incremental phase shift and amplitude weighting is applied to each of the stored sub-accumulation signals from the previous cycle to form a new set of sub-accumulation signals associated with the next signal group. Dual processing storage channels are incorporated into each subsection to reduce error build-up and means are provided to alternately clear one of the processing storage channels while the other one of said channels performs the decoding computation.

BRIEF DESCRIPTION OF THE DRAWINGS

The novel features of this invention, as well as the invention itself, will be better understood from the accompanying description taken in connection with the accompanying drawings in which like reference characters refer to like parts and in which.

Figures 1, 2:
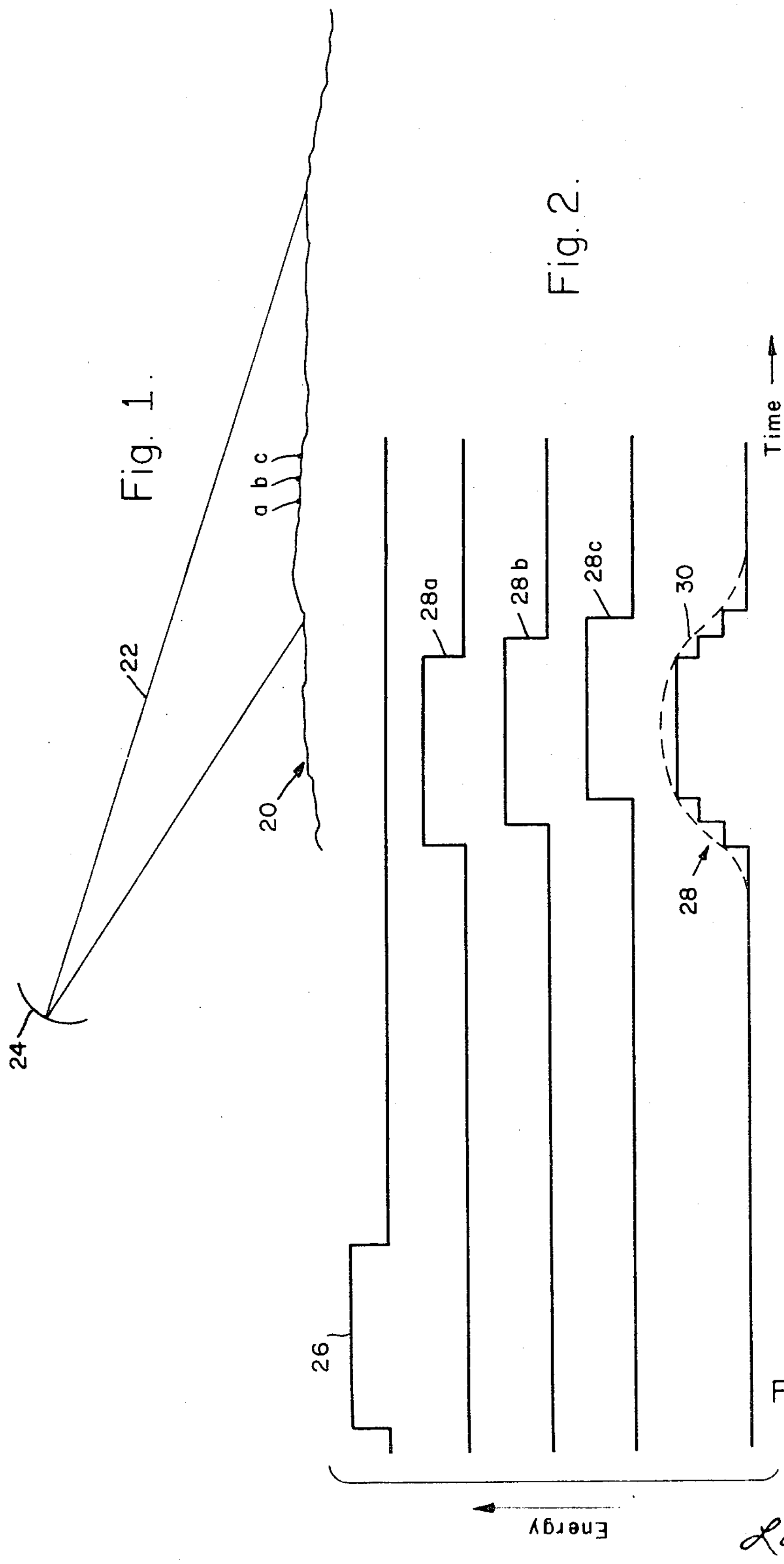
FIG. 1 depicts a group of discrete closely spaced reflectors within the radiation beam of the transmission system of the subject invention and is useful in the explanation of the operation of the invention.
FIG. 2 shows waveforms of a transmitted signal pulse, received signals from each of the reflectors of FIG. 1, and a composite signal received from the three reflectors.
Figures 4, 7:
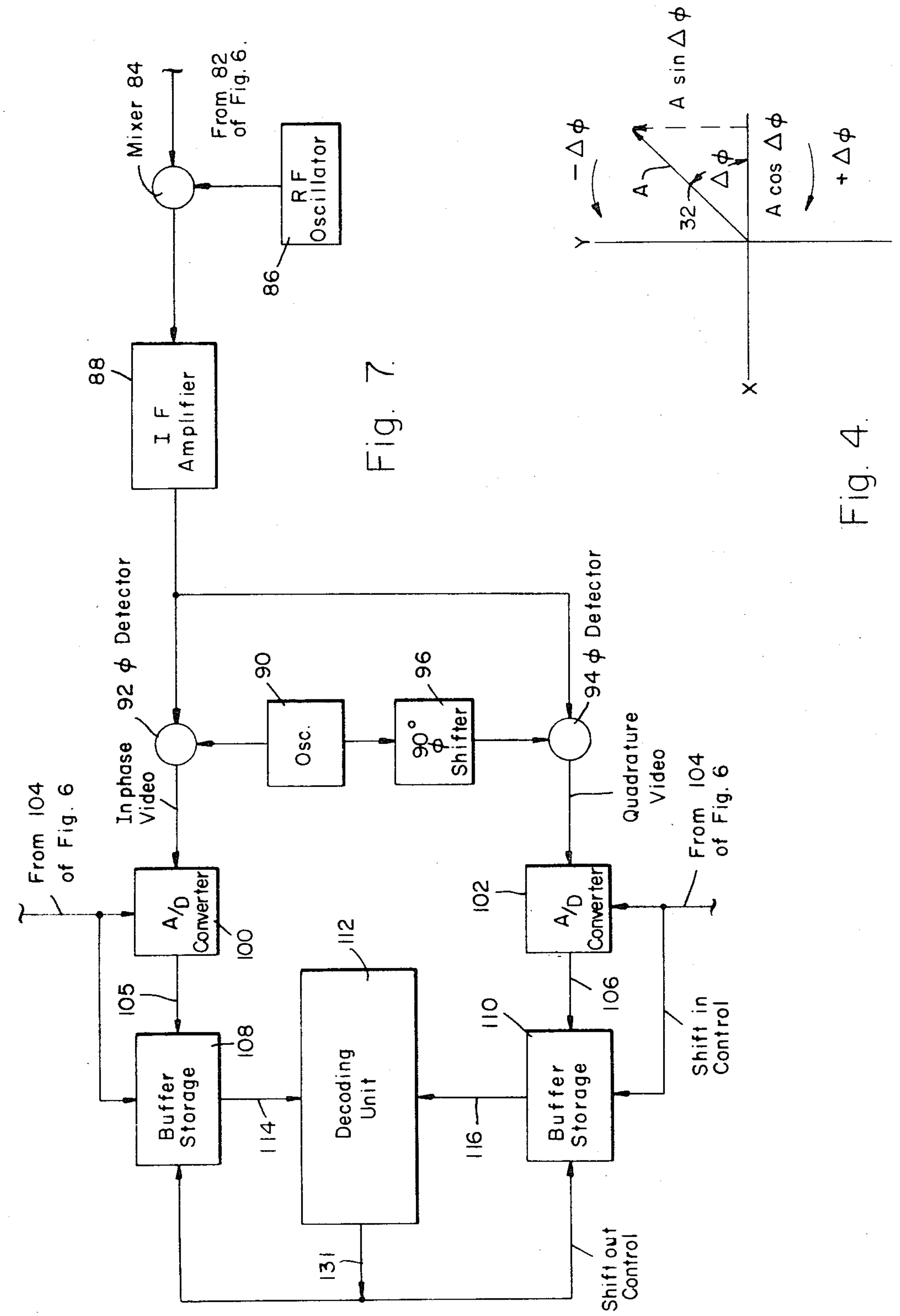
FIG. 4 is a vector diagram for explaining the vectorial symbology adapted herein.
Figure 6:
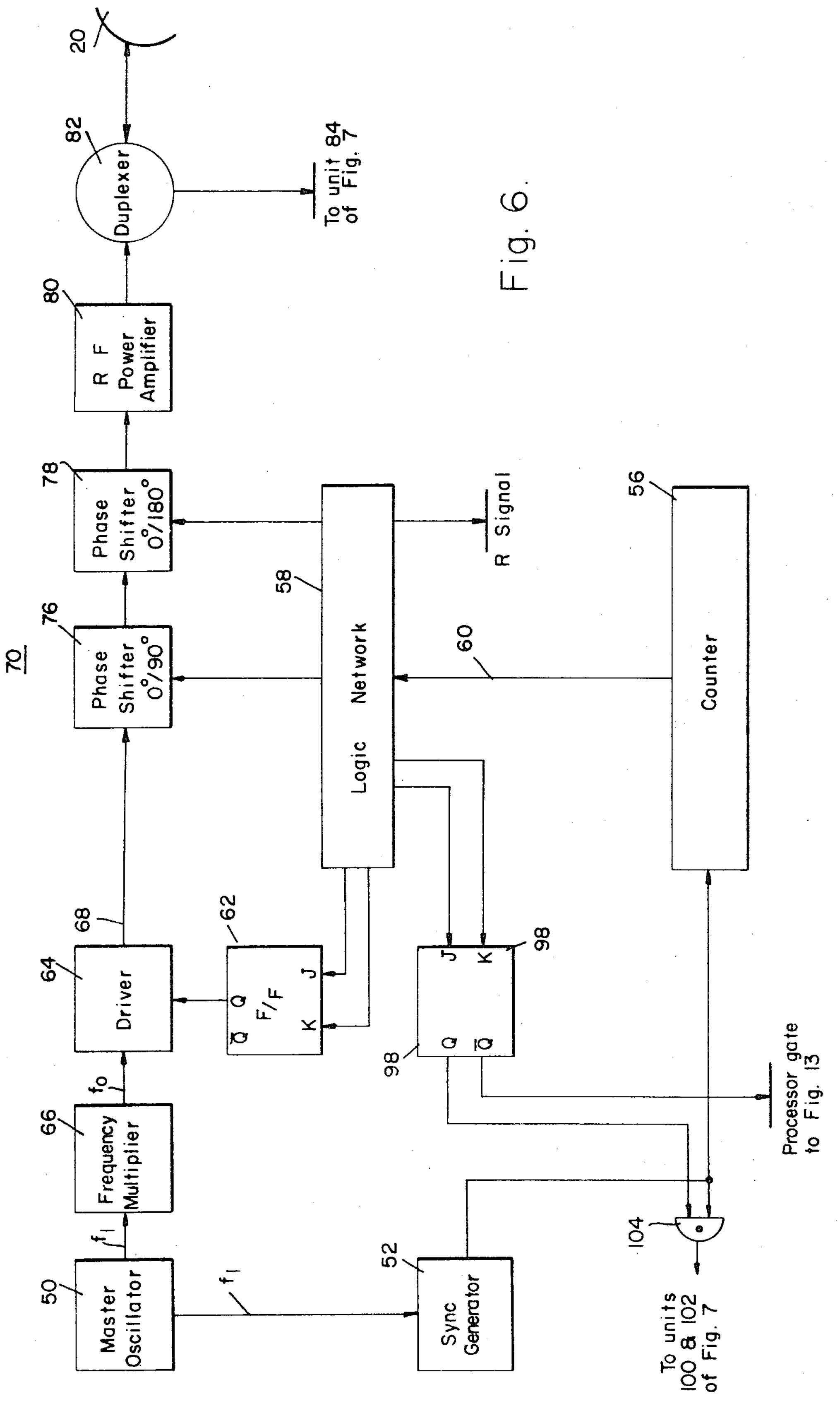
Figure 8:
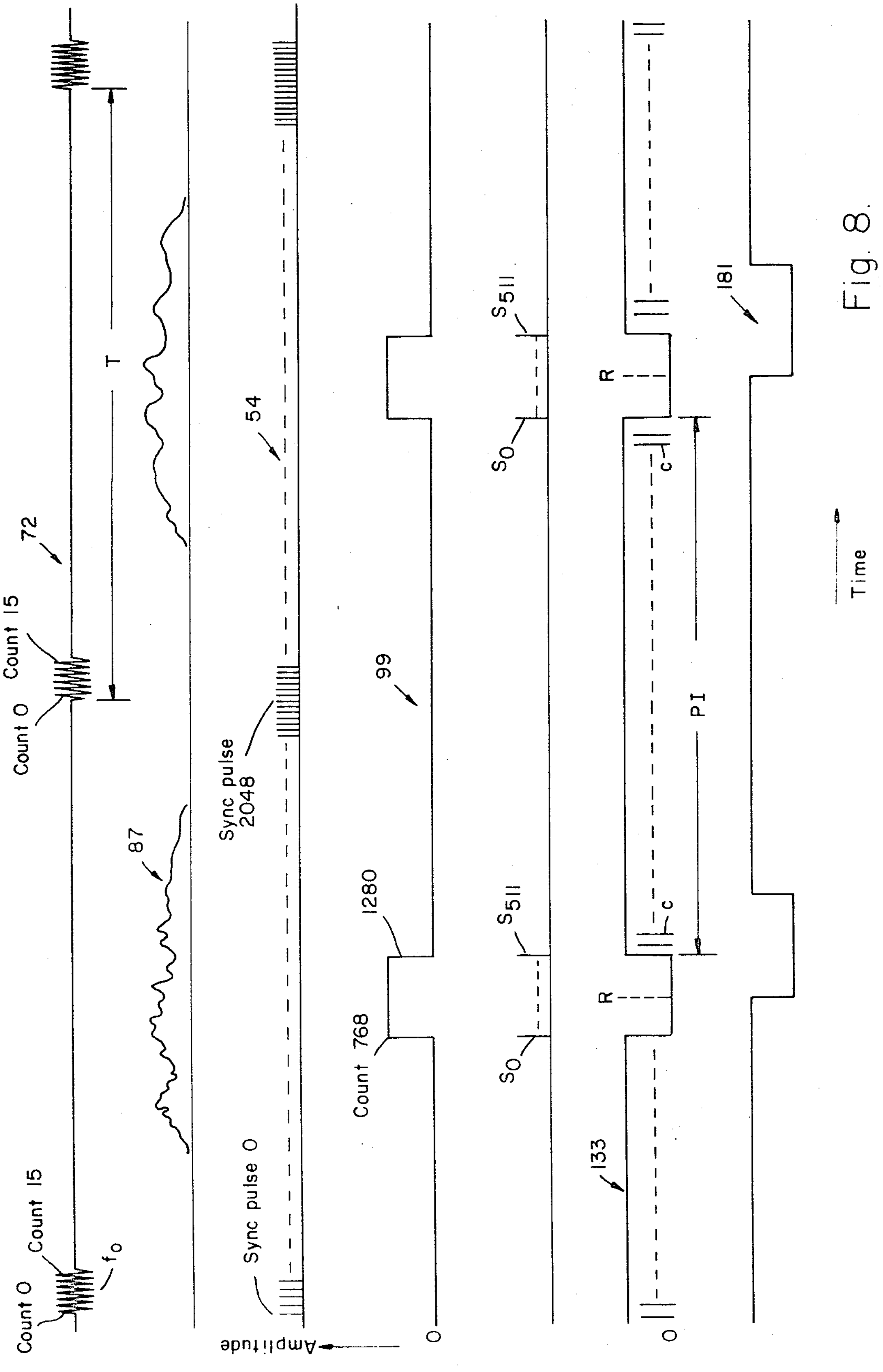
Figure 9A:
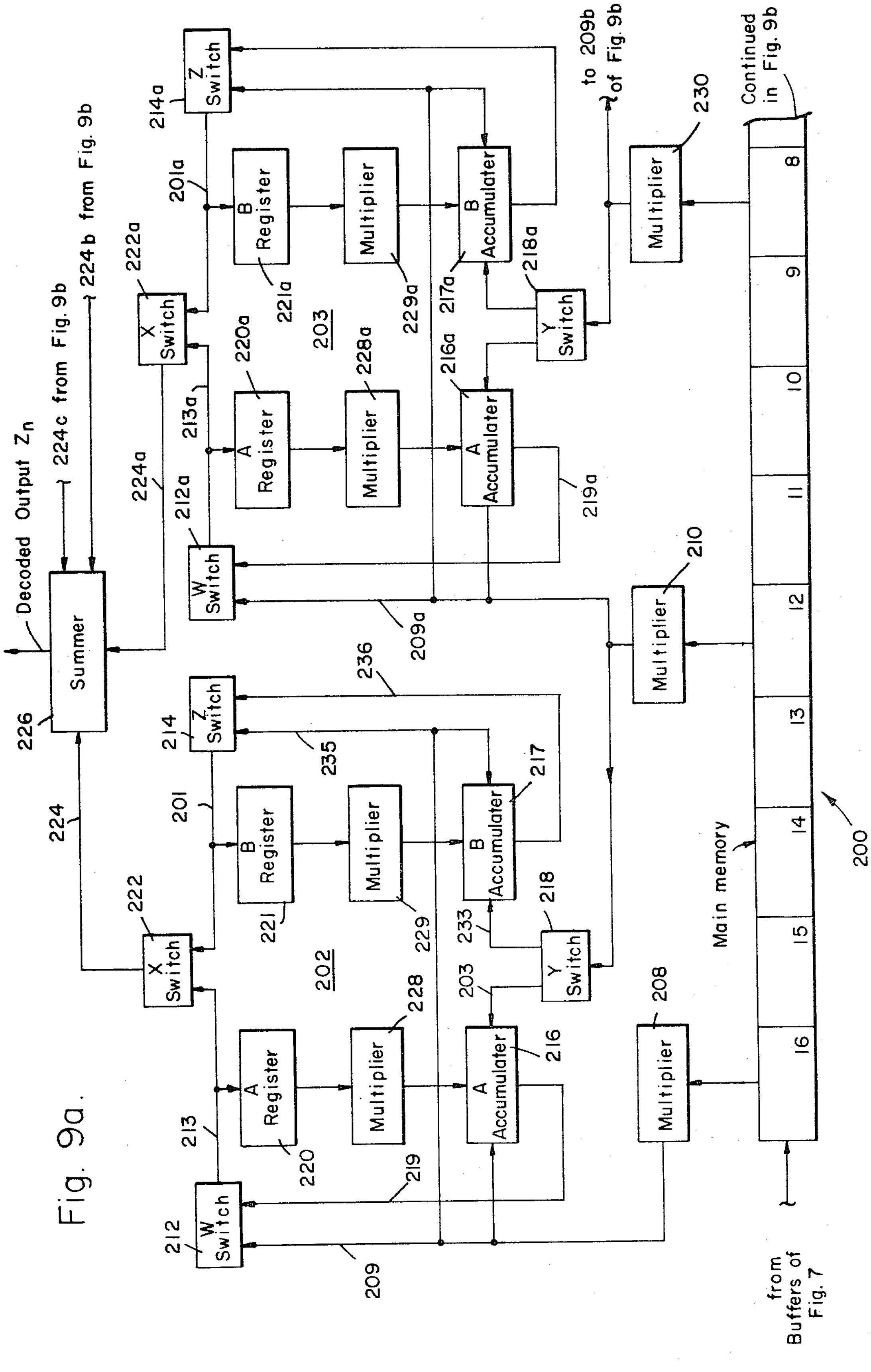
Figure 9B:
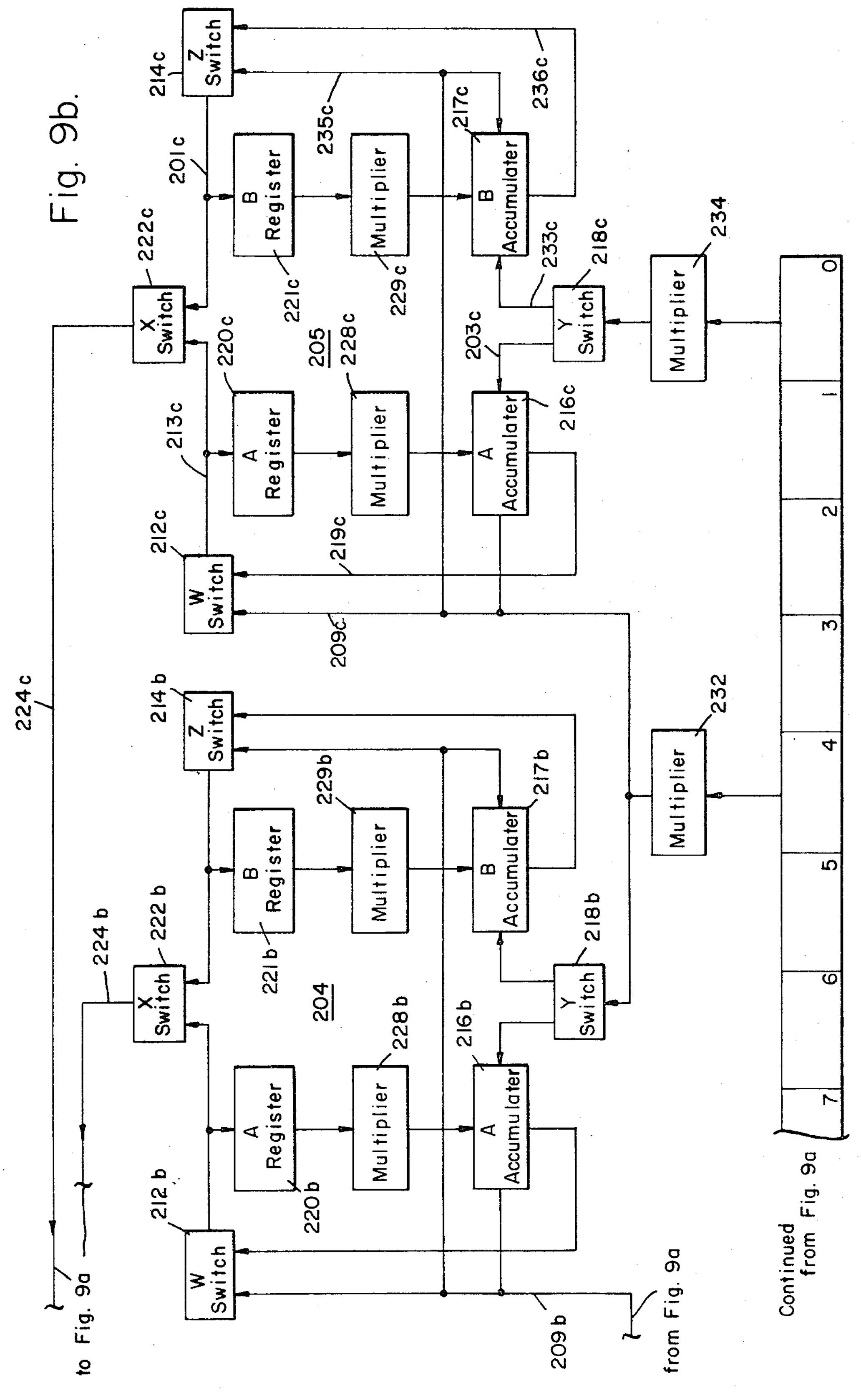
Figure 10:
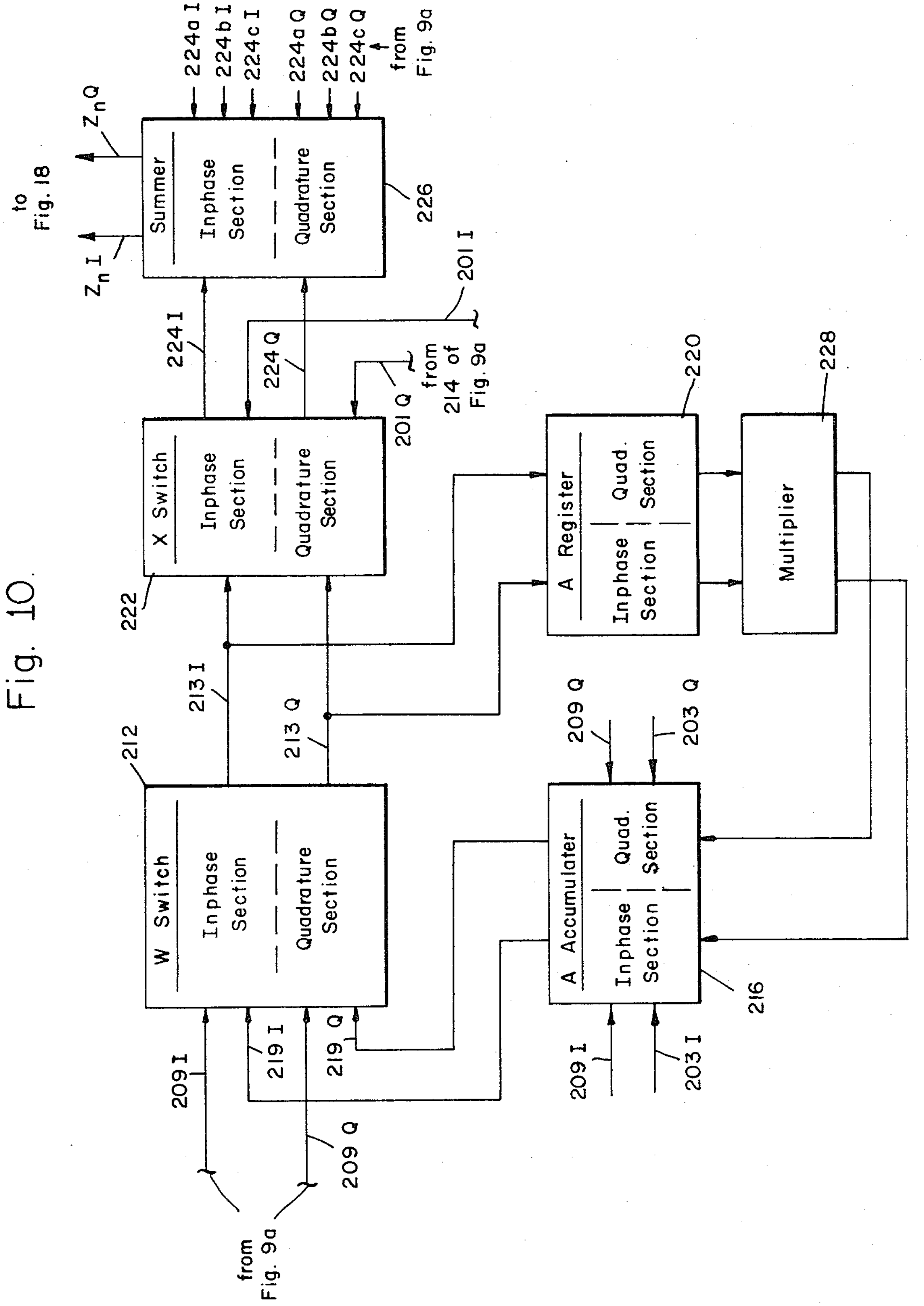

FIGS. *5a*, *5b* and *5c* illustrate a simplified decoding sequence for the signals from each of the reflectors of FIG. 1 for the purpose of assisting in the visualization of the pulse compression effect derived from polyphase encoded signals;

FIG. 6 is a block diagram of a system for transmitting a polyphase encoded signal in accordance with the principles of the invention;

FIG. 7 is a block diagram of a receiver for processing the received reflected energy in accordance with the principles of the invention;

FIG. 8 is a graph of timing waveforms useful in the explanation of the operation of the disclosed system;

FIGS. 9*a* and 9*b* are a block diagram of one preferred embodiment of a decoding system in accordance with the principles of the subject invention;

FIG. 10 is a more detailed block diagram of a portion of the decoding system for FIG. 9*a;*

Figure 11:
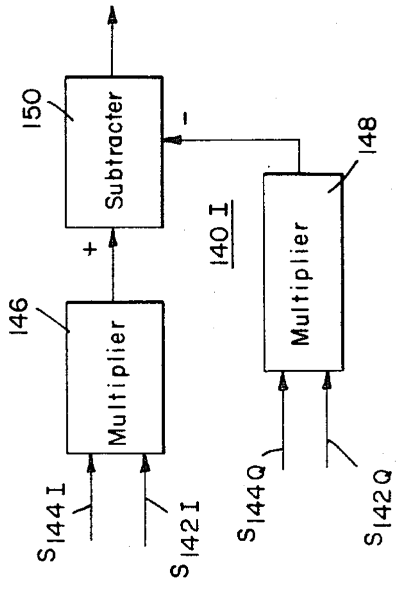
Figure 12:
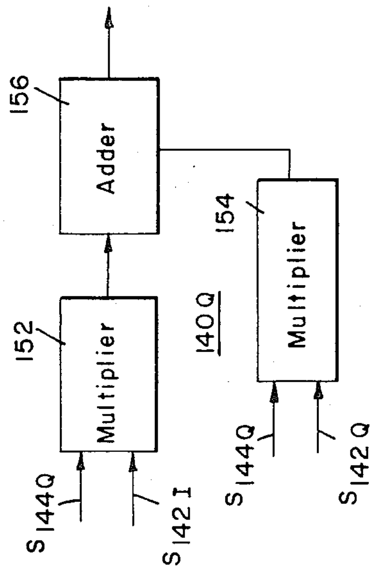

FIGS. 11 and 12 are block diagrams of inphase and quadrature multiplier units respectively, which may be utilized in the decoder system of FIGS. 9*a* and 9*b;*

Figure 13:
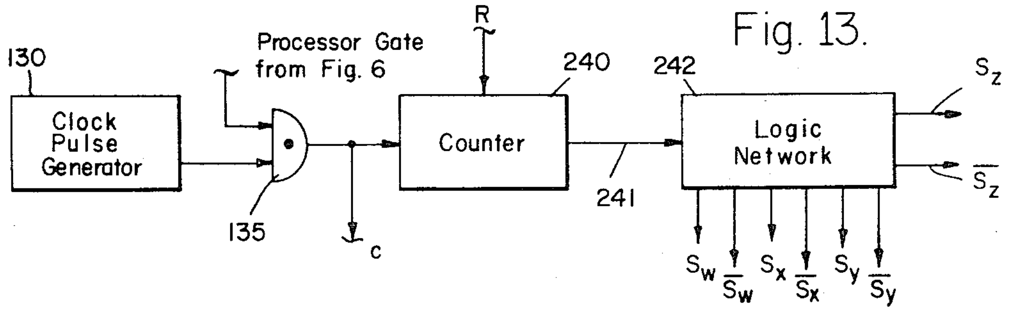

FIG. 13 is a block diagram of a control network which may be utilized in the decoder system of FIGS. 9*a* and 9*b;*

FIGS. 14, 15, 16 and 17 are block diagrams of switching circuits adaptable for incorporation into the decoder system of FIGS. 9*a* and 9*b;*

Figure 18:
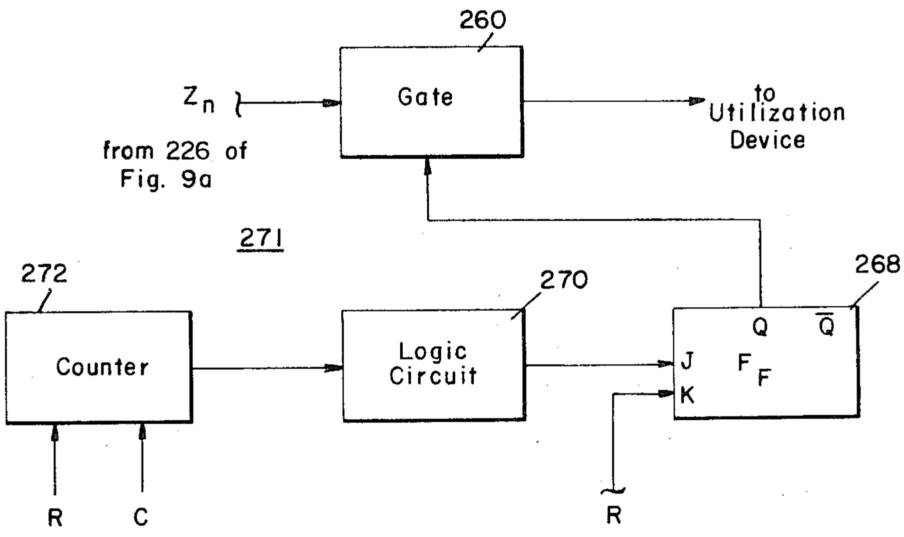
Figure 19:
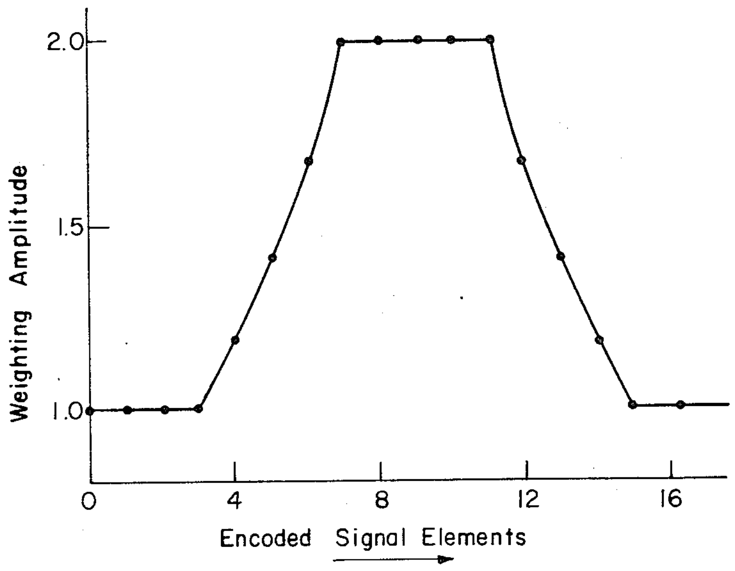

FIG. 18 is a block diagram of an output signal gating circuit adapted for use in conjunction with the decoding system of FIGS. 9*a* and 9*b;* and FIG. 19 is a graph of one amplitude weighting function suitable for explaining the features of the decoding units of FIGS. 9*a* and 9*b* related to reducing the "spectral sidelobes" of the decoded signal.

DESCRIPTION OF THE PREFERRED EMBODIMENT

The subject invention may be better understood by first discussing polyphase code techniques and a pulse compression application requiring the decoding of consecutive groups of encoded signals.

FIG. 1 shows in greatly simplified terms one such application wherein the terrain 20 includes closely spaced reflector elements *a*, *b* and *c* within the pattern 22 of an antenna 24. If it is assumed that the transmitted energy pulse is as shown by a waveform 26 in FIG. 2, waveforms 28*a*, 28*b* and 28*c* of FIG. 2 show the return signal from the reflectors of FIG. 1 designated by the same letter; and waveform 28 the composite received video signal. Dashed line 30 depicts the shape of signal 28 after processing by a receiver of limited bandwidth, and as may be seen from envelope 30 the range of the individual reflectors could not be determined simply from the amplitude of the composite signal 28.

Figure 3:
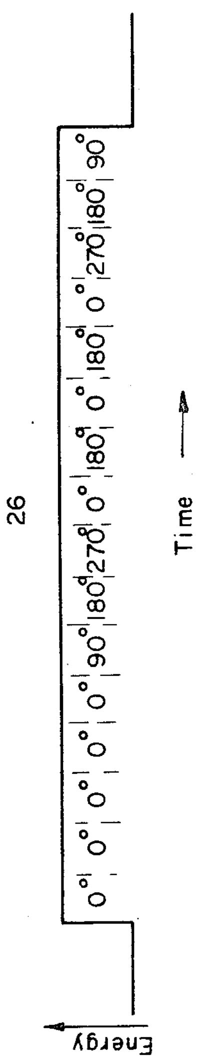
FIG. 3 depicts the relative phase shift within a transmitted pulse for a simplified code of four encoded states and 16 elements.

If the transmitted pulse 26 were first phase encoded with a suitable code, range resolution may be greatly enhanced and by way of example the transmitted pulse 26 is shown at an expanded time scale in FIG. 3 as encoded by a "Frank" code having four phase states and 16 encoded elements. The "Frank" code is well known in the art and will be discussed in greater detail hereinafter. The phase encoded on each of the elements within pulse 26 is indicated in the FIG. 3 and may be determined from the matrix of Table I as read from left to right progressing from the top to the bottom row.

TABLE I

| | | | |
|---|---|---|---|
| 0 | 0 | 0 | 0 |
| 0 | 90 | 180 | 270 |
| 0 | 180 | 0 | 180 |
| 0 | 270 | 180 | 90 |

Before further proceeding with the explanation of the pulse compression application, the vector symbology adapted herein will first be explained with reference to FIG. 4. The relative phase of the transmitted energy contained within pulse 26 may be represented by vector 32 of length A referenced to an XY coordinate system. The coordinate system (X,Y) is assumed to rotate at an angular frequency $f_o$, equal to the fundamental frequency of the transmitted pulse.

A phase shift $\Delta\phi$ in the transmitted signal relative to the fundamental frequency $f_o$ is shown by the angle between the X axis and the vector; and the vector may be defined by the magnitude of the inphase component along the X axis (A cos $\Delta\phi$) and the imaginary component (A sin $\Delta\phi$) along the Y axis. Sometimes hereinafter such a vector is designated by the complex notation $A \cos \Delta\phi + jA \sin \Delta\phi = A\epsilon^{j\Delta\phi}$. As indicated in FIG. 4, a clockwise phase rotation has arbitrarily been assigned a positive value while a counterclockwise rotation (phase delay) is designated a negative value. A phase advance of X degrees may be mechanized by phase delay of $2\pi - X$ degrees.

To properly decode a transmitted pulse such as pulse 26 (FIG. 3) a phase rotation equal to but opposite to the phase encoded during transmission is impressed on the received signal (multiplication by the complex conjugate of the encoded value). If the received signal 28 were applied to a shift register such that all the signal elements of the signal reflected from one of the reflectors, such as the reflector *b* for example, were contained within the shift register then the range interval corresponding to the area containing the reflector *b* could be examined by providing the appropriate decoding phase shift.

Figure 5A:
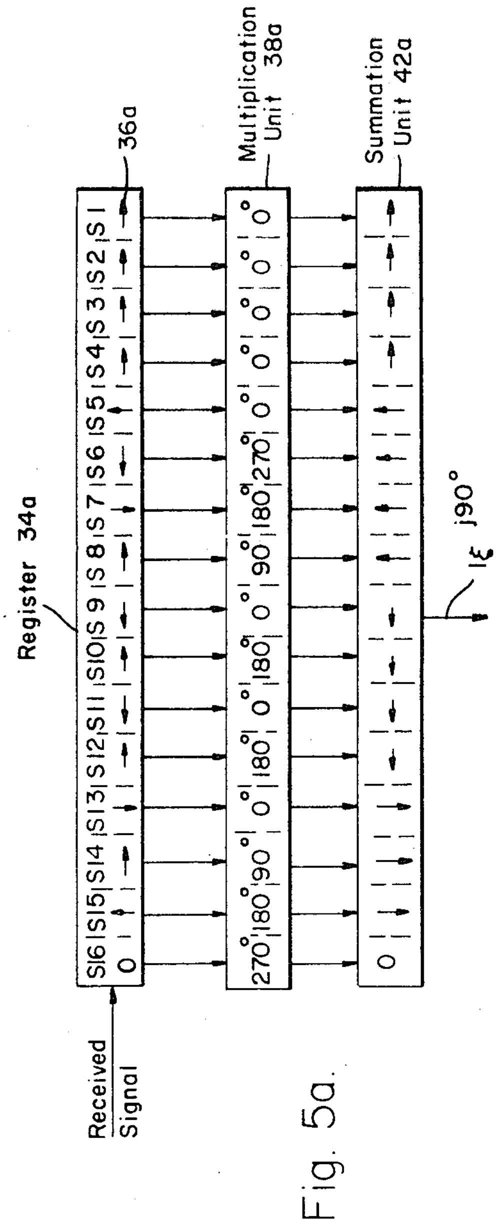
Figure 5B:
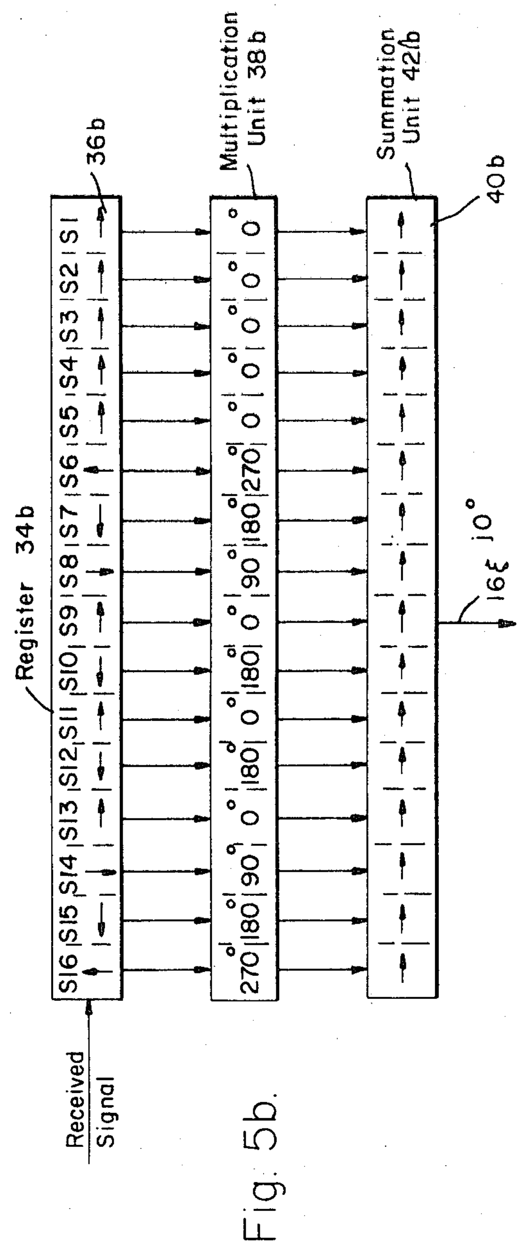
Figure 5C:
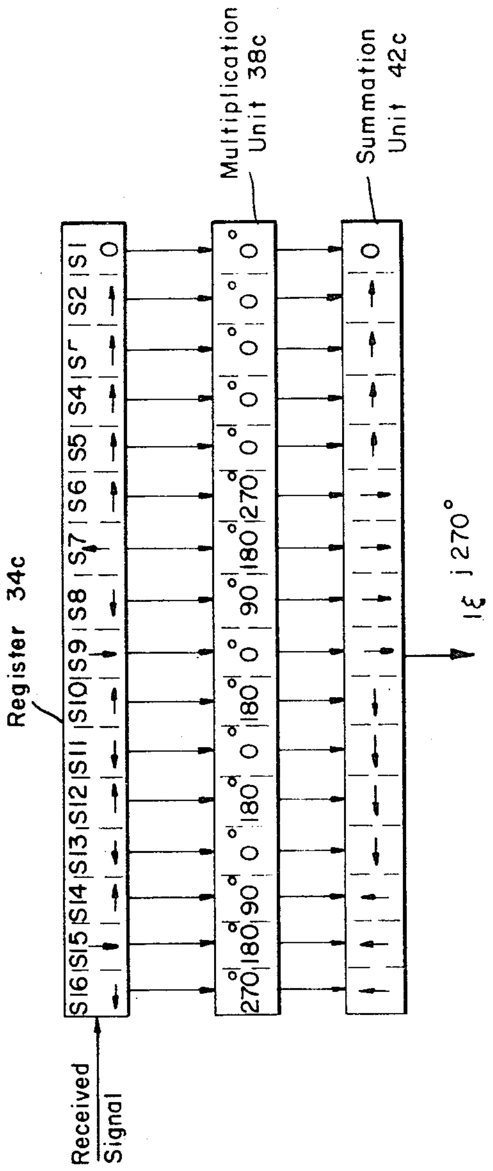

This decoding process may be visualized by referring to FIG. 5*a*, 5*b* and 5*c* wherein each of the returned signals 28*a*, 28*b* and 28*c* respectively are decoded as though they were separately processed. If it is assumed that the signals are processed in a linear manner prior to the decoding step an analysis of each signal separately and a combination of results thereof is indicative of the results of the simultaneous processing of the signals (Superposition Theorem). It is assumed that the signal elements of the received signal 28 are shifted into 16 stage registers 34*a*, 34*b* and 34*c* so that the signal elements associated with each reflector are stored within the correspondingly labeled register. If it is further assumed that at the time of a particular observation the last return element from reflector *b* had been just received, it may be shown that by proper decoding the received energy from reflector *b* is enhanced while the energy from reflectors *a* and *c* is attenuated. In FIG. 5 the received signal components are illustrated as being separately processed in registers 34, multiplication units 38 and summers 42 bearing postscripts corresponding to the component signal from the reflector designated by the same letter — it being understood that in actuality one unit simultaneously processes the composite signal 28.

The signal elements $S_1$ through $S_{16}$ associated with reflector *b* are shown in FIG. 5*b* as being stored in the register 34*b*. The relative phase of each received signal elements is indicated by vector arrows such as arrow 36*b*. To decode the signal group contained in the register 34*b* a phase rotation equal in magnitude but opposite in direction to that impressed upon the transmitted signal is required. This phase rotation may be produced in a complex multiplication unit 38*b* which produces the phase shift indicated therein which is opposite to the phase shift impressed on transmitted signal 26. Complex multiplication units will be described in detail subsequently during the explanation of the decoder unit of FIG. 9.

The output of the multiplication unit 38*b* (phase indicated by arrows such as 40*b*) is applied to a complex summation unit 42*b* and the sum produced by this unit is indicated at the output thereof as a vector with an amplitude 16 times that of each element of the signal 28*b* and at a relative phase angle of zero ($16\epsilon^{j0}$).

It will be noted in FIGS. 5*a*, 5*b* and 5*c* that each element of the same stage (rank) of shift register 34 receives the same phase rotation in the multiplier unit 38. However, the signals associated with reflectors *a* and *c* are at a different relative position in the registers and are decorrelated whereas the signals from the reflectors *b* are centered in the register and are correlated. In regard to this last point, it will be noted that in register 34*a* the signal $S_0$ (the first return from reflector *a* at time $t=0$) had been shifted out of the register and the entire code is one position to the right of the corresponding elements in register 34*b* with no energy in position $S_{16}$ in register 36*a*. Similarly the code elements in the register 34*c* are each shifted one position to the left of the elements of the register 34*b*. As indicated by the sum values at the outputs of the summation networks 42, the reflected energy from the range interval being correlated (reflector *b*) is enhanced and the energy value from the adjacent uncorrelated range intervals (*b* and *c*) are substantially attenuated.

One of the more important characteristics of a decoding system for utilization in pulse compression applications is the ratio of the signal value originating from reflectors within a particular range interval being examined to the energy received from contiguous range intervals. It is noted that some of the energy in the decoded output signal for a particular range interval not only originates within adjacent range intervals but also some of the energy is received from other range intervals within the equivalent range of the transmitted pulse. As used herein the term sidelobe energy is the sum of the energy present in the output signal for a particular range interval which originated from reflectors located in other range intervals. It may be shown that significant sidelobe energy is produced by signals from the extreme positions of the transmitted pulse equivalent range zone. This is caused by the fact that signals originating from reflectors within the end range zones provide fewer encoded elements in the received signal and decorrelation (phase cancellation) is reduced. As will be explained subsequently, the subject invention is adaptable to providing "amplitude weighting" during the decoding processing to reduce the effect of reflecting sources at the ends of the effective pulse length range interval.

The selection of the type of code for pulse compression applications involves such considerations as maximizing range resolution (a large signal to sidelobe ratio) while at the same time keeping mechanization costs within reasonable limits. The method and mechanization in accordance with the subject invention makes it possible to accurately, reliably and economically decode and amplitude weight received reflected signals encoded with a polyphase code having equal subsequence lengths (the number of signal elements comprising each sequence are the same) and having a constant phase slope throughout each subsequence. One such code type which may be readily encoded onto the transmitted signal and which has been demonstrated to provide adequate range resolution comprises $N^2$ signal elements with N discrete phase states equally dividing 360°.

One specific code which is suitable for use in the mechanization and method of the subject invention, and which is well documented in the literature if the "-Frank" code. The "Frank" code is described in numerous references such as an article in the October 1961 edition of the *IRE Transactions*, entitled "Information Theory," pages 254 through 257, by R. C. Heimiller; and the article entitled "Polyphase Codes With Good Non-Periodic Correlation Properties" in the January 1963 issue of *Professional Group On Information Theory*, by R. L. Frank. Such a code of N discrete states and length $N^2$ may be defined by sequentially reading from left to right and top to bottom the phasors in the square matrix of N × N shown in Table II.

TABLE II

| | | | |
|---|---|---|---|
| $W^{0 \cdot N}$ | $W^{0 \cdot 1}$ | $W^{0 \cdot 2}$ | . . . $W^{0 \cdot (N-1)}$ |
| $W^{1 \cdot N}$ | $W^{1 \cdot 1}$ | $W^{1 \cdot 2}$ | . . . $W^{1 \cdot (N-1)}$ |
| | . | | |
| | . | | |
| | . | | |
| $W^{(N-1) \cdot N}$ | $W^{(N-1) \cdot 1}$ | $W^{(N-1) \cdot 2}$ | . . . $W^{(N-1) \cdot (N-1)}$ |

In the matrix of Table II, $W = \exp(j\, 2\pi/N)$ and the element in the *k*th row and the *p*th column is designated $W^{kp}$. The notation $\exp(j\, 2\pi/N)$ designates that the constant $\epsilon$ is raised to the $j2\pi/N$ power where $j=\sqrt{-1}$. Hence, the notation $W^{kp}$ represents $\epsilon^{(j2\pi/N)kp}$ which is equal to the $\cos(2\pi/N)kp + j \sin(2\pi/N)kp$ and as will become apparent during the subsequent explanation of the mechanization of the subject invention multiplication by the last mentioned term is the same as a vector phase rotation of $(2\pi/N)kp$ degrees.

Without distracting from generality, it is perhaps clearer to explain the code matrix by way of an example for $N=8$ illustrated in Table III.

TABLE III

Encoded Phase Shift in Degrees

| | | | | | | | |
|---|---|---|---|---|---|---|---|
| 0 | 0 | 0 | 0 | 0 | 0 | 0 | 0 |
| 0 | 45 | 90 | 135 | 180 | 225 | 270 | 315 |
| 0 | 90 | 180 | 270 | 0 | 90 | 180 | 270 |
| 0 | 135 | 270 | 45 | 180 | 315 | 90 | 225 |
| 0 | 180 | 0 | 180 | 0 | 180 | 0 | 180 |
| 0 | 225 | 90 | 315 | 180 | 45 | 270 | 135 |
| 0 | 270 | 180 | 90 | 0 | 270 | 180 | 90 |
| 0 | 315 | 270 | 225 | 180 | 135 | 90 | 45 |

Read from left to right and top to bottom Table III gives the relative phase shift encoded on the transmitted signal. To decode sequences or groups of signals which have previously been encoded by the polyphase function it is necessary to counterrotate the phase of the received signal elements by the same phase function (opposite direction of rotation) as was utilized during the encoding process. For example, in complex notation, a phase shift of 45° may be mechanized by a multiplication by the complex quantity $(1+j)/\sqrt{2}$. To decode a signal element which had been encoded by the just mentioned 45° phase shift would require multiplication by the complex conjugate of the encoding function, i.e., $(1-j)/\sqrt{2}$. The decoding sequence for the code matrix may be obtained by reading the top row first and then the bottom row up to the top row with each row being read from left to right.

In the interest of clarity of explanation the decoder unit in accordance with the subject invention will be illustrated in respect to the relatively simple "Frank" code of length 16 of Table I. In the code of Table I the basic phase shift is $2\pi/\sqrt{16}$ radians which is equal to 90° and corresponds to complex multiplication by the operator $j = \sqrt{-1}$. The "Frank" code for example of $N^2 = 16$ is given in the form of complex numbers in Table IV and the corresponding decoding or phase correlation function is given in Table V.

TABLE IV

Encoded Phase Shift In Terms Of Complex Notation

| | | | |
|---|---|---|---|
| 1 | 1 | 1 | 1 |
| 1 | $j$ | $-1$ | $-j$ |
| 1 | $-1$ | 1 | $-1$ |
| 1 | $-j$ | $-1$ | $j$ |

TABLE V

Phase Correlation Function In Complex Notation

| | | | |
|---|---|---|---|
| 1 | 1 | 1 | 1 |
| 1 | $-j$ | $-1$ | $j$ |
| 1 | $-1$ | 1 | $-1$ |
| 1 | $j$ | $-1$ | $-j$ |

An amplitude weighting function selected arbitrarily for illustrating the principles of the subject invention is shown in FIG. 19 and the relative amplitude values of this function for one encoded signal group is listed in Table VI.

TABLE VI

Amplitude Weighting Values

| | | | |
|---|---|---|---|
| 1 | 1 | 1 | 1 |
| 2 | $2^{1/4}$ | $2^{1/2}$ | $2^{3/4}$ |
| 2 | 2 | 2 | 2 |
| 1 | $2^{3/4}$ | $2^{1/2}$ | $2^{1/4}$ |

Considering each row of the code matrix to be a subsequence, the general type of amplitude function most adaptable to the mechanization disclosed herein is a continuous set of approximately straight lines with break points at the end of the subsequences. A discontinuous set of straight lines could be readily mechanized with the addition of multiplier units. The weighting function shown in FIG. 19 illustrates increasing, decreasing and constant segments. The increasing and decreasing segments are not exact straight line functions but follow the curve $$y = K_2^x K_1^{1-x} \text{ for } 0 \leq x \leq 1 \qquad \text{Eq. (1)}$$

where $K_1$ and $K_2$ are the values of the beginning and end points of the segment respectively.

The net correlation function is the term by term product of the amplitude weighting and phase correlation functions of Tables V and VI respectively, and is listed in Table VII for the "Frank" code of $N^2 = 16$.

TABLE VII

Net Correlation Function

| | | | |
|---|---|---|---|
| 1 | 1 | 1 | 1 |
| 2 | $-2^{1/4}j$ | $-2^{1/2}$ | $2^{3/4}j$ |
| 2 | $-2$ | 2 | $-2$ |
| 1 | $2^{3/4}j$ | $-2^{1/2}$ | $-2^{1/4}j$ |

Considering any continuous sequence of input signals designated $a_n$ where $n$ is equal to 0,1,2,3 . . . etc. and designating the net correlation function as $A_k$, for $0 \leq k \leq N^2-1$, the Nth output signal from the decoder system of the subject invention may be defined by the equation:

$$Z_n = \sum_{k=0}^{N^2-1} A_k a_{n+k} \qquad \text{Eq. (2)}$$

The decoding function of Equation (2) may be mechanized as discussed hereinafter relative to FIGS. 9a and 9b and the digital mechanization which is the subject of this invention results in a substantial reduction in the number of arithmetic operations necessary to amplitude weight and phase decode sequences of groups of $N^2$ phase encoded signals.

Also, the mechanization in accordance with the subject invention requires a shift register having only N + 1 output terminals as contrasted with a requirement for $N^2$ output terminals in some prior art decoding systems. In micro-miniature circuits the number of required output leads is a significant factor in determining the size and economy of circuit devices and hence a design which significantly reduces the number of output taps possesses an economic advantage due to this feature alone. Additionally, in radar ranging and mapping applications each group of received signal elements corresponds to only one range interval and for a typical such application of for example $2^{10}$ range intervals, the reduction in arithmetic operations results in significant processing savings (equipment or processor time).

Prior to a detailed description of one preferred embodiment of a decoder unit in accordance with the subject invention, a radar system suitable for transmitting a suitable polyphase encoded signal and for receiving and processing the reflected return video signal groups in accordance with the invention will first be described.

Referring now primarily to FIG. 6 which shows the transmission and synchronization portion of such a radar system, a master oscillator 50 provides a high frequency signal at a frequency $f_1$ to a synchronization (sync) generator 52. Generator 52 which may comprise conventional differentiation and pulse shaping networks, provides a series of sync pulses (waveform 54 of FIG. 8) to a pulse counter 56. Counter 56 is coupled to a logic network 58 on composite lead 60. Network 58 includes suitable conventional logic circuits for providing enable signals to selected output leads during preselected counts of the counter 56.

Unless otherwise specified, it may be assumed that all the flip-flop circuits discussed herein are set by applying a 1 level logic signal (such an enable signal may be arbitrarily selected at a positive potential) to the J input terminal and are reset by applying a 1 level logic signal to the K input terminal. When a flip-flop circuit is in a set state, the Q output terminal is at the 1 logic level and when it is in the reset state the Q output terminal is at the 0 logic level (which may be arbitrarily selected as ground or reference potential).

After the counter 56 reaches its maximum count, for example 2048, it automatically resets to zero. Network 58 senses the zero count and applies an enable signal (1 level) to the J terminal of a control flip-flop 62. The Q output terminal of flip-flop 62 is coupled to a driver or power amplifier device 64. The device 64 may be any type of gated RF amplifier assembly and may include a transistor amplifier or traveling wave tube (TWT). Device 64 is mechanized such that it is enabled (provides an RF output pulse) during the time period that the flip-flop 62 is in the set state.

For a code of N = 4 phase states, the code would comprise 16 elements with the respective phase rotation indicated in Table I above. Logic circuit 58 provides a 1 level signal to the K terminal of the flip-flop 62 when the counter 56 reaches the count of 15. Hence, after 16 counts, the Q output terminal of the flip-flop 62 switches to the zero level and the driver 64 is disabled (no output signal is generated).

The input signal to the driver unit 64, at a frequency $f_o$ is applied from the frequency multiplication unit 66 which unit "steps up" the frequency $f_1$ applied thereto from the master oscillator 50 (by the generation of harmonic frequencies in a nonlinear device and filtering, for example). A gated output signal at frequency $f_o$ (waveform 72 of FIG. 8) is applied to a phase shift network 70 on a lead 68 during the time period that flip-flop 62 is set, i.e., for the first 16 synchronization time periods out of every 2,048 sync periods, for example.

The phase shift network 70 is controlled in response to the logic network 58 to encode the RF pulses 72 in accordance with the polyphase code specified in Table I. Logic network 58 may comprise conventional gate circuits for sensing each count from 0 through 15 and for enabling the proper combination of phase shifter on each count. For the code of Table III, the required phase shifts may be mechanized with only two phase shift units 76 and 78. These units could comprise RF waveguide sections with diodes or varactors coupled thereacross so that the specified phase shift is added when an enabling signal is applied to the respective units. For example, the unit 76 will provide a 90° phase shift when enabled and a 0° phase shift when disabled. It is noted that for the polyphase code of Table I the required phase shifts are obtained by the proper combination of only two phase shift units and the 270° phase shift may be obtained by enabling both of the units 76 and 78.

The phase modulated output signal from the phase shift unit 70 is amplified in final RF amplifier stage 80, which may include a cross field amplifier (CFA) or TWT, for example, to the final power level and is then coupled through duplexer unit 82 to transmission and reception antenna 20.

Referring now primarily to FIG. 7 the RF energy received from reflectors within the antenna pattern 22 (FIG. 1) is applied from antenna 20 through duplexer 82 to a mixer 84. The RF reference signal to the mixer 84 is applied thereto from a stable local oscillator 86, and the mixer translates the received RF energy to the intermediate (IF) frequency band. The output signal from the mixer 84 is applied to and amplified by IF amplifier 88.

The output signal from amplifier 88 is phase detected against an intermediate frequency signal from reference oscillator 90 in a phase detector 92. If the received input signal from the phase detector 92 is represented by a vector of length A with a phase B relative to the phase of the signal applied from oscillator 90 (arbitrarily established phase standard), then the output of detector 92 may be represented by the quantity A cos B which is sometimes hereinafter designated I for inphase received video.

Similarly, the signal from IF amplifier 88 is applied to a quadrature phase detector 94. The reference signal from oscillator 90 after being phase shifted 90° by phase shifter 96, is applied as the reference signal to the phase detector 94. Hence, the output signal of detector 94 is translated 90 degrees from that of detector 92 and may be represented by the quantity A sin B — which quantity is sometimes hereinafter designated Q for received quadrature video.

Numerous considerations determine the length of the range zone to be examined by the processing sections of the receiver. For example, the height of the antenna, the antenna pattern and look-down angle control which range zones are illuminated by the transmitted energy. Herein it is arbitrarily assumed that the interpulse period T (see FIG. 8) is subdivided into 2,048 range intervals and that the range zone to be examined by the processing portion of the system is the center 512 range intervals of each transmission period.

A minimum/maximum range gate (waveform 99 of FIG. 8) which is at the 1 level between the minimum and maximum ranges of interest, is generated by a flip-flop 98 (FIG. 6) in response to enabling signals applied from logic network 58. For example, if the J terminal of flip-flop 98 is enabled when counter 56 reaches a count of 768 and the K terminal enabled at the count of 1,280 then 512 range resolution cells would be included within the range zone of interest.

Upon the application of sync pulses during the minimum/maximum range gate period (sampling periods), analog to digital converter units 100 and 102 sample the inphase and quadrature video signals respectively applied thereto from detectors 92 an 94. Units 100 and 102 convert video signals to digital words of the desired precision, e.g., each word could comprise eight bits including sign bit. The minimum/maximum range gate signal is combined with the sync pulses (waveform 54) in an AND gate 104 (FIG. 6) and the output signal of this gate (sampling pulses) is applied to converters 100 and 102 for synchronization thereof.

The digital words representative of the digital value of the inphase and quadrature signals are applied from the converter units on composite leads 105 and 106 respectively to buffer storage units 108 and 110. The inphase and quadrature binary words are shifted out of the buffer units 108 and 110 to decoder unit 112 on composite leads 114 and 116 respectively in response to shift signals applied to the buffer storage units from the decoder unit.

For the illustrated example incorporation of the buffer storage units allows the decoding unit 112 to operate at a reduced processing rate. However, it will be understood that in applications where processing times are not a factor these buffers may be eliminated and the decoding unit operated at the sampling rate. In the illustrated embodiment data is stored in the buffer storage units under the control of the sampling pulses from AND gate 104 during the minimum/maximum range gate periods and retrieval of data is controlled by the decoder 112 during the interpulse period exclusive of the minimum/maximum range period.

One preferred embodiment of the decoding unit 112 which exhibits the aforementioned advantages of increased accuracy and a reduction in the heretofore required number of arithmetic operations is shown in FIGS. 9*a* and 9*b*. These two last mentioned figures together illustrate one preferred embodiment of the decoding unit and will sometimes hereinafter be generally referred to as FIG. 9. As there shown, the unit 112 comprises a shift register 200 having N + 1 output taps displaced every N stage along the length thereof. Associated with each output tap is a processing subsection identified by reference numerals 202 through 205 inclusively. All of the processing elements shown in FIG. 9 are dual channel parallel devices for separately processing the inphase and quadrature signals and all the connecting leads are composite leads (e.g., perhaps comprising 20 individual leads with 10 for each inphase and each quadrature word respectively. Fixed value (multiplier values stored in unit) complex multipliers 208 and 210 are associated with stages designated 16 and 12 respectively of shift register 200. The output signal of multiplier 208 is applied in parallel to a W switch 212, a Z switch 214, an "A accumulator" 216 and to a "B accumulator" 217. The output signal of multiplier 210 is coupled in parallel to Y switch 218, W switch 212*a*, Z switch 214*a*, "A accumulator" 216*a* and to "B accumulator" 217*a*.

It is noted that the organization and mechanization of the subsections 202 through 205 inclusively are quite similar and hence corresponding elements of the sections 203, 204 and 205 are given the same reference numeral as the corresponding element in section 202, followed by letter *a*, *b* or *c* respectively. For example, the W switch in section 202 is designated 212 while the corresponding switch in section 203 is designated 212*a;* in section 204 it is designated 212*b;* and in section 205 the corresponding W switch is designated 212*c*.

Again primarily considering section 202 the output signal from A channel accumulator 216 is applied to a second input terminal of W switch 212 and the output from this switch is coupled in parallel to an A channel storage register 220 and to a sub-accumulation output X switch 222.

Similarly the output signal from B channel accumulator 217 is applied on a lead 236 to Z switch 214 and the output from switch 214 is coupled in parallel to a B channel storage register 221 and to a second input terminal of the sub-accumulation output X switch 222 on a lead 201. The output signal from X switch 222 is applied on a lead 224 to a final summer 226.

The output signal from A storage register 220 is applied through a fixed value multiplier 228 to a second input terminal of A accumulator 216 and one of the output terminals of Y switch 218 is applied to a subtrahend input terminal of A accumulator 216 on lead 203. Similarly, the output signal of B register 221 is applied through a multiplier 229 to one input terminal of B accumulator 217 and a second output terminal of Y switch 218 is coupled to a subtraction input terminal of B accumulation unit 217.

Multiplication units 230, 232 and 234 are coupled to the stages 8, 4, and 0 respectively of shift register 200. Subsections 203, 204 and 205 are coupled between multiplier pairs 210, 230; 230, 232; and 323, 234 respectively. The output sub-accumulation signal from section 203 is coupled from X switch 222*a* on composite lead 224*a* to one of the input terminals of final summer 226. Similarly, the sub-accumulation signal (the output signal) from section 204 is applied from X switch 222*b* to another one of the input terminals of summer 226 on a lead 224*b;* and the sub-accumulation output signal from X switch 224*c* is applied on a lead 224*c* to a fourth input terminal of final summer 226.

The output signal from summer 226 is applied on a lead 236 to an output gating circuit 271 (FIG. 18) and from there to a utilization device such as a display unit or computer unit (not shown).

In order to more clearly explain the inphase and quadrature aspects of the mechanization of the decoding unit 112, A register 220, multiplier 228, A accumulator 216, and the switching units and input signals associated therewith are shown in greater detail in FIG. 10. Referring now primarily to FIGS. 9 and 10, the W switch 212 is shown in FIG. 10 as comprising two sections, an inphase section and quadrature section, with the inphase component of the signal from accumulator 216 applied on a composite lead 219I and the quadrature portion of this signal applied on a composite lead 219Q. The coupling of the output signal from the multiplier 208 is shown with an inphase component applied on lead 209I to the inphase section of the W switch 212 and the quadrature component of the output signal from the multiplier 208 applied on a lead 209Q to the quadrature section of the W switch 212. The W switch 212 will be explained in greater detail hereinafter relative to FIG. 14 but for the discussion relative to FIG. 10 it may be assumed that the leads (one for each bit of the inphase and quadrature word) from either multiplier 208 or accumulator 216 are selectively switched through the unit 212 in response to a control signal (not shown in FIGS. 9 and 10) applied thereto. Hence, the inphase and the quadrature components of a selected one of the digital words to X switch 222 are coupled to inphase and quadrature input terminals respectively of the summer 226.

The inphase and quadrature output signals of the W switch 212 are applied to the inphase and quadrature sections respectively of the A register 220 for storage. During the next processing cycle these last mentioned signals are applied through multiplier 228 to the input terminals of inphase and quadrature sections of the A accumulator 216.

It will be noted in FIG. 10 that the inphase and quadrature signals are essentially processed in parallel and the leads coupling said signals between units are given the same numerical designation as the corresponding composite leads shown in FIG. 9 except that the inphase and quadrature channels are identified by the letters I and Q respectively. Further, it should be noted that all leads shown in FIGS. 9 and 10 are of course composite leads and all of the terminals are composite terminals for parallel processing the plurality of bits associated with each of the inphase and quadrature signals.

Now referring momentarily to FIG. 13, a clock generator unit 130 generates timing pulses such that data from the required number of range intervals, for example, 512 range intervals per interpulse period are processed during each processing interval (PI, see waveform 133 of FIG. 8). The pulses from clock generator 130 are combined in AND gate 135 with the $\overline{Q}$ output pulses of flip-flop 98 (FIG. 6) to provide gated clock pulses *c* to all units of FIGS. 9 and 10. To maintain the clarity of the drawings the leads for applying clock pulses are not shown in FIGS. 9 and 10 nor are the control lead for the W, X, Y and Z switches. However, the mechanization for controlling the switches is disclosed hereinafter and shown in FIGS. 14, 15, 16 and 17. As shown in waveform 133 of FIG. 8, the processing time interval is the complement of the storage period defined by the minimum/maximum range gate (waveform 99).

The gated clock pulses from AND gate 135 are also applied to buffer units 108 and 110 (FIG. 7) to initiate the shifting of the digital words from these units to the inphase and quadrature channels of shift register 200.

The operation of the complex multiplier units shown in the mechanization of FIG. 9 may be explained by first recalling that the product of two complex numbers, for example, complex numbers $S_{144I} + j\, S_{144Q}$ and $S_{142I} + j\, S_{142Q}$, is $S_{144I}\, S_{142I} - S_{144Q}\, S_{142Q} + j(S_{144Q}\, S_{142I} + S_{144I}\, S_{142Q})$ where $S_{144I}$ and $S_{144Q}$ are the inphase and quadrature component terms of a first complex number $S_{142I}$ and $S_{142Q}$ are the inphase and quadrature terms of a second complex number; and $(S_{144I}\, S_{142I} - S_{144Q}\, S_{142Q})$; and $(S_{144Q}\, S_{142I} + S_{144I}\, S_{142Q})$ are the inphase and quadrature terms respectively of the complex product of these two complex numbers. The inphase and quadrature sections of the multiplier units shown in FIG. 9 may be mechanized to form these product term components as indicated by sections 140I and 140Q of FIGS. 11 and 12 respectively.

As shown in FIG. 11 multiplier units 146 and 148 which may be conventional digital multipliers, form the terms $S_{144I}\, S_{142I}$ and $S_{144Q}\, S_{142Q}$ respectively and the latter term is subtracted from the former term in a subtraction unit 150 to form the inphase term of the complex product. Similarly, as shown in FIG. 12, multiplier units 152 and 154 form the terms $S_{144Q}\, S_{142I}$ and $S_{144I}\, S_{142Q}$ respectively and these terms are combined in adder 156 to form the quadrature term of the complex product.

Referring again to FIG. 13, the clock pulses from AND gate 135 are applied to a counter 240 the output from which is coupled on a composite lead 241 to a logic network 242. Network 242 includes switchable conventional logic circuits for providing switch control signals $S_w$, $\overline{S}_w$; $S_x$, $\overline{S}_x$; $S_y$, $\overline{S}_y$ and $S_z$ and $\overline{S}_z$ for controlling switches W, X, Y and Z respectively according to a selected count pattern. The count pattern logic which is repetitive every 2N processor clock pulses, will be explained hereinafter relative to the feature of the subject invention for reducing error build-up. Counter 240 may be any suitable conventional counter of the type wherein after it reaches its maximum count (2N in the illustrated embodiment) it resets to zero. Logic network 242 may include separate flip-flop circuits (not shown, but referred to hereinafter as W, X, Y and Z) associated with correspondingly labeled pairs of control signals and which are set and reset on selected counts of the counter 240.

Figure 14:
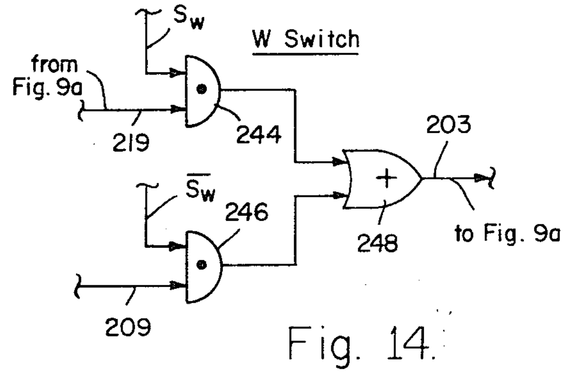

Referring now to FIG. 14 and to subsection 202 of FIG. 9a, each stage (for switching one data bit) of W switch 212 may be mechanized as shown in FIG. 14. For example, one of the data bits from multiplier 208 applied to the W switch on the composite lead 209 is combined in AND gate 246 with the signal $\overline{S}_w$ from logic network 242. It is understood that the leads shown in FIGS. 14, 15, 16 and 17 and designated by reference numerals corresponding to the composite leads of FIG. 9 are but one lead associated with one bit of the digital word applied on the corresponding composite lead. The corresponding data bit from the output of A accumulator 216 is combined with the $S_w$ output signal of network 242 in an AND gate 244. The output signals from the AND gate 244 and 246 are combined in an OR gate 248 and the output signal from this OR gate is applied in parallel to A register 220 and X switch 222. The mechanization and control of the other W switches shown in FIGS. 9a and 9b are identical to that just described relative to FIG. 14.

Figure 16:
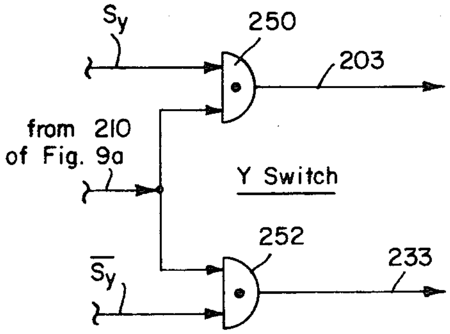

The Y switch 218 of subsection 202 applies the output signal from multiplier 210 to the subtrahend input terminal of either A accumulator 216 or B accumulator 217. As shown in FIG. 16 the Y switch 218 may be mechanized (the mechanization for one bit shown) by applying the output signal from the multiplier 210 to an input terminal of each of two AND gates 250 and 252. The $S_y$ output terminal of logic network 242 is coupled to the other input terminal of AND gate 250 and the $\overline{S}_y$ output of network 242 is applied to the second input terminal of AND gate 252. The output signal of AND gate 250 is applied on a lead 203 to the A accumulator 216 and the output signal of the AND gate 252 is applied on a lead 233 to B accumulator 217.

Figure 17:
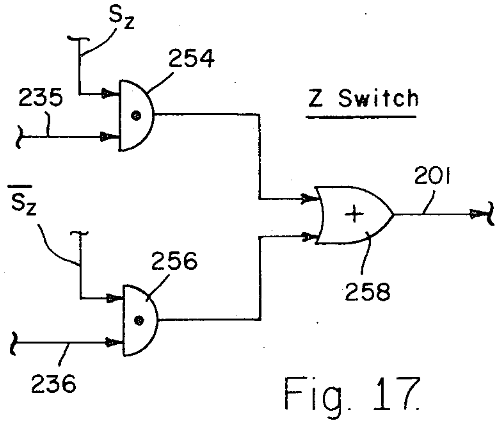

The mechanization of one stage (the mechanization for one bit) of a Z switch such as switch 214 is shown in FIG. 17. As there shown, input signals applied on a pair of input leads 235 and 236 to AND gate 254 and 256 respectively are selectively coupled by means of an OR gate 258 to an output lead 215. The gates 254 and 256 are controlled by $\overline{S}_z$ and $S_z$ signals applied from logic network 242.

Figure 15:
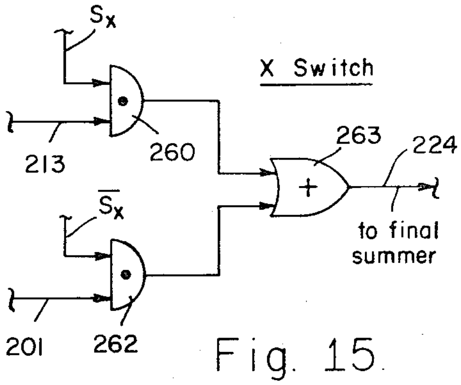

FIG. 15 shows a mechanization of one stage an X switch such as switch 222 utilized in the mechanization of subsection 202, for applying the output signals from the W or from the Z switch to the final summer 226. As shown in FIG. 15 input signals applied on leads 213 and 215 to AND gates 260 and 262 respectively are controlled in response to the $S_x$ and $\overline{S}_x$ signals from network 242 and one of said signals is coupled through the OR gate 263 to the final summer on a lead 224.

As will become clear during the summary of the operation of the subject invention, $N^2$ processing cycles are required to produce an output signal representative of the amplitude weighted decoded value of the first encoded signal group. The output signal from the summer 226 is applied to the gate circuit 260 shown in FIG. 18 and this circuit is controlled so that the output signal therefrom is not gated to a utilization device (not shown) until after the first encoded signal group has been decoded. This feature is mechanized by controlling gate 260 with the control signal (waveform wave 181 of FIG. 8) applied from the Q output terminal of a flip-flop 268. Flip-flop 268 is set at a preselected count, for example, at the count of 16 ($N^2$ gated clock pulses) after the reset pulse. Logic circuit 270 senses when the last mentioned count has been reached in counter 272 at which time a set signal is applied from circuit 270 to the J input terminal of the flip-flop 268. Both the counter 272 and the flip-flop circuit 268 are reset prior to the start of each processor cycle. Hence, the gate 260 gates through the output signal from the summation unit 226 only after the first decoded output signal is developed.

OPERATION

In the operation of the subject invention, the transmitter unit shown in FIG. 6 transmits a series of RF energy pulses at a pulse repetition rate $1/T$ (waveform 72 of FIG. 8). Each of the transmitted pulses is encoded by an N state polyphase code comprising $N^2$ encoded elements (see FIG. 3). Encoding of the transmitted pulses is provided by phase shifter unit 70 which is controlled by logic network 58. For a code having four phase states, logic network 58 would sense counts zero through 15 of the counter 56 and activate the proper combination of phase shift units so that the phase shifts listed in Table I are encoded on the transmitted signal.

During the time period between energy pulses, reflections from objects within the antenna beam pattern 22 are received by the receiver unit of FIG. 2. It is noted that each reflector which is illuminated will return a polyphase encoded signal of length $N^2$ and where the spacing between reflecting sources is less than the length of the transmitted pulse the return from contiguous reflectors will be in time coincidence.

The minimum/maximum range gate (waveform 99 of FIG. 8) is combined with the sync pulses (waveform 54) in the AND gate 104 (FIG. 6) to produce sampling pulses which control the operation of the inphase and quadrature channels of A/D converters 102 and 104 (FIG. 7) and the storage of data in buffer units 108 and 110. If 512 samples, for example, are stored in the buffer units during each interpulse period (as mechanized in the disclosed embodiment) then these elements of data may be designated $S_0$, $S_1$, $S_2$ . . . through $S_{511}$ with the signal elements $S_0$ through $S_{15}$ representing the first received encoded signal group, $S_1$ through $S_{16}$ the second received encoded signal group, $S_2$ through $S_{17}$ the third group and so on with $S_{496}$ through $S_{511}$ being the last group of signal elements to be decoded during a particular interpulse period.

The data stored in the buffer units during the minimum/maximum range gate interval is shifted into the decoding unit 112 one word at a time during the processor interval (waveform 133 of FIG. 8) in response to clock pulses provided by gate 135 (FIG. 13).

A polyphase code of the "Frank" type of length $N^2 = 16$ has been selected to illustrate the principles of operation of the subject invention so that the description may be more clearly and concisely presented than if a code of greater length had been selected. However, it will be understood that the principles of the subject invention are applicable to codes of any length and are particularly suited to long code lengths because of the error accumulation reduction feature which will be described more fully hereinafter.

For a code of length 16 the basic phase shift is $2\pi/\sqrt{16}$ or 90° which corresponds to multiplication by the complex multiplier j. The encoded phase angles for the just mentioned polyphase code are tabulated in Table I and are expressed in complex notation in Table IV. The phase correlation function associated therewith is given in complex notation form in Table V.

As mentioned previously, one of the general type of amplitude function which approximates a continuous set of straight line segments with break points at the end of the subsequences was selected arbitrarily for the purpose of describing the amplitude weighting features of the subject invention. This arbitrarily weighting function is shown in FIG. 19 an is tabulated in Table VI.

The net correlation function is the term by term product of the amplitude weighting and phase correlation function and is tabulated in Table VII. Considering a continuous sequence of input phase encoded, four phase state signals $a_n$ for $n = 0, 1, 2, 3$ . . . etc. to be decoded using the weighting function of FIG. 19 and starting with some arbitrary value $a_n$ then the amplitude weighted phase encoded output signal from summer 226 is as described by Equation (2) as:

$$Z_n = \sum_{k=0}^{15} A_k^a\, n+k \qquad \text{Eq. (2)}$$

The operation of the subject invention may be easier understood by first not considering the operation of the B channel in all subsections such as B register 221, multiplier 229 and accumulator 217 and assuming that the W switches are all set so that the output of the A accumulators are gated through these switches, the X switches are all set to the A channel and the Y switches are all set so that the input thereto is applied to the associated A accumulators.

The values of multiplier constants applied by the multipliers at the output terminals of the shift register 200 (FIG. 9) correspond to the values at the end of the subsequences of the weighting function shown in FIG. 19. It is noted that the multiplier code index is reversible in the shift register 200. The multiplier constants for the weighting function associated with the embodiment of FIG. 9 (illustrated in FIG. 19) are tabulated in Table VII.

TABLE VIII

Value of Multiplier Constants for Input Tap Multipliers

| Multipliers | Value of Multiplier Constants |
|---|---|
| **208** | 1 |
| **210** | 2 |
| **230** | 2 |
| **232** | 1 |
| **234** | 1 |

The value of complex multipliers at the input to the accumulators such as multipliers 228 and 229 are tabulated in Table IX.

TABLE IX

Value of Multiplier Constants for Subsection Multipliers

| Multipliers | |
|---|---|
| **228***c* and **229***c* | 1 |
| **228***b* and **229***b* | $2^{-1/4} j$ |
| **228***a* and **229***a* | $-1$ |
| **228** and **229** | $-2^{1/4} j$ |

These values of Table IX are determined so that each accumulator such as 216 will decode one subsequence of the encoded signal group. The phase of the complex multiplier in each subsection is the initial phase of the associated subsequence and this phase is multiplied by the Nth root of the ratio of the initial and final value of the weighting function for that subsequence, where N is the length of the subsequence. For the illustrated embodiment, where N is equal to 4, for the first subsequence the multiplication value (subsection 205) is $\sqrt{1/1}=1$; for the second subsequence the multiplication value (subsection 204) is $\sqrt[4]{1/2}(j)=2^{-1/4}j$; the value for the third subsequence (subsection 203) is $\sqrt[4]{2/2}(-1)=-1$; and for the fourth subsequence (subsection 202) the value is $\sqrt[4]{2/1}\ (-j)=-2^{1/4}j$.

Still assuming that the switches are continually set so as to enable only the A channel, the operation of the decoder 112 may be explained with reference to Table X.

TABLE X

OPERATING SEQUENCE

| Processing Step | Sub-Accumulation Output Lead | Signal |
|---|---|---|
| 1 | 224 | $a_0$ |
| | 224a, 224b, 224c | 0 |
| 2 | 224 | $a_1-2^{1/4}j\,a_0$ |
| | 224a, 224b, 224c | 0 |
| 3 | 224 | $a_2-2^{1/4}j\,a_1-2^{1/2}a_0$ |
| | 224a, 224b, 224c | 0 |
| 4 | 224 | $a_3-2^{1/4}j\,a_2-2^{1/2}a_1+2^{3/4}j\,a_0$ |
| | 224a, 224b, 224c | 0 |
| 5 | 224 | $a_4-2^{1/4}j\,a_3-2^{1/2}a_2+2^{3/4}j\,a_1+2a_0-2a_0$ |
| | 224a | $2a_0$ |
| | 224b, 224c | 0 |
| . | . | . |
| . | . | . |
| . | . | . |
| 16 | 224 | $a_{15}-2^{1/4}j\,a_{14}-2^{1/2}a_{13}-2^{3/4}j\,a_{12}+2a_{11}-2\,a_{11}$ |
| | 224a | $2a_{11}-2\,a_{10}+2\,a_9-2\,a_8+2\,a_7-2\,a_7$ |
| | 224b | $2a_7+2^{3/4}j\,a_6+2^{1/2}\,a_5-2^{1/4}j\,a_4+a_3-a_3$ |
| | 224c | $a_3+a_2+a_1+a_0$ |
| 17 | 224 | $a_{16}-2^{1/4}j\,a_{15}-2^{1/2}a_{14}+2^{3/4}j\,a_{13}+2a_{12}-2a_{12}$ |
| | 224a | $2\,a_{12}-2\,a_{11}+2\,a_{10}-2\,a_9+2\,a_8-2\,a_8$ |
| | 224b | $2\,a_8+2^{3/4}j\,a_7-2^{1/2}a_6-2^{1/4}j\,a_5+a_4-a_4$ |
| | 224c | $a_4+a_3+a_2+a_1+a_0-a_0$ |

This table lists a series of steps (processor clock pulse periods) as the signal elements to be decoded $a_0$, $a_1, a_2 \ldots a_n$ are applied to the shift register 200 at stage 16 and the resultant signals which appear on each of the input leads 224, 224a, 224b and 224c to the final summer 226. For example, when the signal $a_0$ enters position 16 of shift register 200 it is applied through multiplier 208 (wherein it is multiplied by I in the subject embodiment) to accumulator 216 and through W switch 212 and X switch 222 to the final summer 226. All other signals to the summer 226 are zero at this time period because all registers are reset to zero by the R signals prior to the start of each processor interval. The leads for applying the R signals to these registers are not shown in FIG. 9 to avoid cluttering the drawing. Also, during the first processing step (initial time period) signal $a_0$ is stored in A register 220. During the next clock period signal element $a_1$ enters position 16 and the signal $a_0$ is shifted to position 15. The signal to the final summer 226 on lead 224 is $a_1-j2^{1/4}a_0$ and this signal is also stored in A register 220. At the third step the output signal of the final summer 226 is $a_2-j2^{1/4}(a_1-j2^{1/4}a_0)$ which equals $a_2-j2^{1/4}a_1-2^{1/2}a_0$. At the fifth step, signal $a_0$ is subtracted out of the term in the storage loop of section 202 and added to the processing storage of subsection 203. The operation of the decoding unit 112 proceeds in a step-by-step manner according to the procedure outlined above and at the 16th clock period the signal $a_0$ is in position 1 in shift register 200 and the output signal from summer 226 as is shown in Table X for each of the composite (sub-accumulation signals) applied on leads 224, 224a, 224b and 224c. This signal from summer 226 after 16 clock pulses is the amplitude weighted, phase decoded signal value of the first group of encoded signals and as was explained previously the mechanization of FIG. 18 is such that the gate 260 is enabled at this time and the output signal from the summer is passed to the utilization (not shown). During each subsequent processing step the value of the next group of encoded signal elements is formed in unit 112 and applied through gating circuit 271 (FIG. 19) to an output utilization device (not shown).

As is clear from the above discussion of the operation of the decoder unit 112, the amplitude weighted phase decoded value for each range interval (group of phase encoded signals) is derived by modifying the N sub-accumulation signals from the preceding decoding cycle. However, for a large number of decoding sequences (i.e., for numerous consecutive groups of decoding cycles during one interpulse period) errors, such as round-off errors in the multipliers, for example, tend to build up and the accuracy of the decoding operation would decrease as the length of the decoding sequences (the number of encoded signal groups) increases. For example, in the mechanization of FIG. 9, one of the subsection multipliers should apply a multiplier constant of $2^{1/4}$, approximately equal to 1.189. However, the exact value of the term $2^{1/4}$ cannot be obtained. Hence, when this term is raised to the fourth power by four circulations through the subsection multiplier it cannot be exactly cancelled by the term subtracted off (applied through the Y switch) and the resulting difference will remain in the accumulator and will tend to build up as a function of the $\sqrt{L}$ where L is the number of terms that has been processed by the decoding unit during one interpulse period.

It has been shown that for sequences of approximately 2,000 phase encoded signals, for an acceptable degree of accuracy, six extra bits of accuracy in the multipliers and accumulators were required to prevent unacceptable contamination of the signals due to the error build-up (accumulated error). The mechanization of FIG. 9 uses dual processing channels in each subsection so that periodically one channel may be cleared while the other channel is used to decode the input data and in the next sequence the other channel is used in the decoding process and the first channel is cleared. With the mechanization in accordance with the subject invention, error build-up can be reduced to a function of the $\sqrt{2N}$ where once again N is the subsequence length.

The mechanization of FIG. 9 obtains the advantages of greatly reduced error build-up by the utilization of parallel channels associated with the A and B registers in each of the processing subsections. The W and Z switches provide the clearing action in either the A or B storage loops with one loop building up for N clock periods and then being utilized for the computation during the following N clock periods. The other loop performs in a similar fashion on alternate N clock period cycles. The X switches select which signal will be applied to the final summer and the Y switches cut off subtraction of the delayed input signal in that storage and multiplier loop which is building up.

It should be noted that the two multipliers such as 228 and 229 which are shown in each section of FIG. 9 could be replaced with a single multiplier if sufficient speed or processing time is available by the simple addition of gates at the input and output of a single multiplier. This is particularly simple since multipliers 228 and 229 both multiply by the same constant, $-2^{-1/4}j$.

Table XI shows the signals which are stored in both the A and the B register of section 205 during one period of 2N clock pulses.

TABLE XI

Operation of Parallel Processing Loop for Reduction of Error Build-up (leads referenced are to FIG. 9*b*)

| Step | Switch Control Signals at the (Enable) Level (see FIGS. 14, 15, 16 and 17) | A register 220*c* | B Register 221*c* |
|---|---|---|---|
| | Z to lead **235***c*, W to lead **219***c*, X to lead **213***c* and Y to lead **203***c*. | | |
| 17 | $S_w, S_x, S_y, S_z$ | $a_4+a_3+a_2+a_1+a_0-a_0$ | $a_4$ |
| | Z to lead **236***c*, W to lead **219***c*, X to lead **213***c* and Y to lead **203***c*. | | |
| 18 | | $a_5+a_4+a_3+a_2+a_1-a_1$ | $a_5+a_4$ |
| 19 | $S_w, S_x, S_y, \bar{S}_z$ | $a_6+a_5+a_4+a_3+a_2-a_2$ | $a_6+a_5+a_4$ |
| 20 | | $a_7+a_6+a_5+a_4+a_3-a_3$ | $a_7+a_6+a_5+a_4$ |
| | W to lead **209***c*, Z to lead **236***c*, X to lead **201***c* and Y to lead **233***c*. | | |
| 21 | $\bar{S}_w, \bar{S}_x, \bar{S}_y, \bar{S}_z$ | $a_8$ | $a_8+a_7+a_6+a_5+a_4-a_4$ |
| | Z to lead **236***c*, W to lead **219***c*, X to lead **201***c* and Y to lead **233***c*. | | |
| 22 | | $a_9+a_8$ | $a_9+a_8+a_7+a_6+a_5-a_5$ |
| 23 | $S_w, \bar{S}_x, \bar{S}_y, \bar{S}_z$ | $a_{10}+a_9+a_8$ | $a_{10}+a_8+a_7+a_6-a_6$ |
| 24 | | $a_{11}+a_{10}+a_9+a_8$ | $a_{11}+a_{10}+a_8+a_7-a_7$ |
| | Z to lead **235***c*, W to lead **219***c*, X to lead **213***c* and Y to lead **203***c*. | | |
| 25 | $S_w, S_x, S_y, S_z$ | $a_{12}+2_{11}+a_{10}+a_9+a_8+a_7$ | $a_{12}$ |

As shown in Table XI during clock period steps 17, 18, 19 and 20, processing loop A is coupled through switch X to the summer 226 while processor loop B is being cleared and built back up (reinitialized) — the error accumulated up to this point having been "dumped" at step 17. At the end of step 20, switch W couples the input multiplier to the output thereof, the Z switch couples the output of B accumulator to the B register and the X and Y switches are coupled so that the signals passed therethrough are associated with the B storage loop. Hence, it may be seen from Table XI that during steps 17 through 20 the A loop is used for processing while the B loop is cleared and then built up to the correct point; and during step 21 through 24 the B loop performs the processing function while the A loop is cleared and built up.

The second column of Table XI gives the logic for the switch control signals for one complete processing, clearing, build-up cycle of loop A and B. Although any suitable conventional logic circuit may be used to control the W, X, Y, and Z switches in accordance with the principles of the subject invention the mechanization of Table XII is presented by way of example.

TABLE XII

Function of Logic Network 242

| Count in Counter 241 | Logic Function Performed by Network 242 |
|---|---|
| 1 | Set flip-flops X, Y and Z |
| 2 | Reset flip-flop Z |
| 3 | |
| 4 | |
| 5 | Reset flip-flop W, X and Y |
| 6 | Set flip-flop W |
| 7 | |
| 8 | |
| 1 | Set flip-flop X, Y and Z |

Thus, there has been described a digital decoding system of reduced complexity for sequentially decoding and amplitude weighting a plurality of phase encoded signal groups. Although a selected preferred embodiment has been described with particularity herein, it is understood that many changes or modifications thereto may be made without departing from the scope of the subject invention. For example, in the illustrated embodiment in the interest of describing the general case for a code of N phase states, complex multiplication units have been shown in all subsections. However, for certain situations the multiplier value is ±1 or $\pm j$ and the corresponding multiplication unit may be eliminated and the input thereto wired directly to appropriate connections of the output terminals thereof. Also, it should be noted that although a weighting function approximating straight contiguous line segments was selected for clarity of explanation, that in accordance with the subject invention other weighting functions may be mechanized — some at the expense of additional multiplication units.

What is claimed is:

1. A device for consecutively decoding and amplitude weighting groups of sequentially applied phase encoded signals, said device comprising:

a memory device having an input circuit for receiving said applied phase encoded signals and having a plurality of output circuits;

a plurality of processing subsections with each subsection including accumulator means for providing during each one of a plurality of processing cycles a sub-accumulation signal that approximates the amplitude weighted phase decoded value of one subsequence of said applied phase encoded signals, means for storing said sub-accumulation signal, multiplier means coupled between the output of said means for storing and one input of said accumulator means for multiplying said stored sub-accumulation signal by a fixed predetermined value, and coupling means for coupling the output of said accumulator means to the input of said means for storing; and signal modifying means coupled between said plurality of output circuits of said memory device and other inputs of said accumulator means of each said subsection for modifying the value of said applied encoded signals and for applying said modified signals to said accumulator means;

whereby the stored sub-accumulation signals are modified as a function of the amplitude weighted differences between the signal group associated with said stored sub-accumulation signals and the next signal group, to form a new set of sub-accumulation signals associated with said next signal group.

2. The device of claim 1 wherein said signal modifying means included a plurality of multiplier units, each coupled to a different one of said plurality of memory device output circuits for modifying the associated signal applied from said memory device as a function of a preselected fixed amplitude weighting value.

3. The device of claim 2 wherein each said accumulator means includes means for adding one of said modified signals to and subtracting another of said modified signals from said stored sub-accumulation signal formed during the last preceding processing cycle.

4. The device of claim 3 wherein said multiplier means includes means for multiplying said stored sub-accumulation signal by a function of the encoded phase of the associated subsequence and of the $N^{th}$ root of a weighting value, where N is the number of signal elements in each subsequence.

5. The device of claim 3 wherein the amplitude weighting is defined by a function approximated by N line segments, each group of encoded signals comprises N subsequences and said fixed predetermined multiplier value associated with said multiplier means in each subsection is a function of the initial phase of the associated subsequence and of the $N^{th}$ root of the ratio of the initial and final value of the associated segment of said weighting function.

6. The device of claim 1 further comprising means coupled to each of said subsections for summing the sub-accumulation signals produced by each subsection, to form an output signal substantially equal to amplitude weighted phase decoded value of a group of said applied phase encoded signals.

7. The device of claim 1 wherein each said group of sequentially applied phase encoded signals comprises $N^2$ signals of N phase encoded states; and said memory device is a shift register having $N^2 + 1$ stages, and $N + 1$ output circuits coupled to different stages along said shift register with $N - 1$ stages between adjacent said output circuits.

8. The device of claim 1 wherein each said applied encoded signal has inphase and quadrature signal components; and said memory device, said plurality of subsections, and said signal modifying means are dual channel devices adapted for processing inphase and quadrature signal components.

9. The device of claim 1 wherein each subsection includes two processing channels with each channel comprising said accumulator means, said means for storing, said multiplier means, and said coupling means; and said device further comprises control means for selectively controlling the coupling of said coupling means within each of said subsections and the coupling of each channel to said signal modifying means, so that one of said processing channels in each subsection provides the associated sub-accumulation signal during one sequence of alternating sequences of decoding cycles and is cleared and reinitialized during the other sequence, and the other channel is cleared and reinitialized during said one sequence and provides said sub-accumulation signal during said other sequence.

10. The device of claim 3 wherein each subsection includes two processing channels with each channel comprising said accumulator means, said means for storing, said multiplier means, and said coupling means; and said device further comprises control means for selectively controlling the coupling of said coupling means within each of said subsections, and the coupling of each channel to said signal modifying means, so that one of said processing channels in each subsection provides the associated sub-accumulation signal during one sequence of alternating sequences of decoding cycles and is cleared and reinitialized during the other sequence and the other channel is cleared and reinitialized during said one sequence and provides said sub-accumulation signal during said other sequence.

11. The device of claim 10 wherein said control means includes switching means coupled between the output of said accumulator means in each channel and the associated means for storing, and in the path of said modified subtraction signal applied to said accumulator means in each channel, for alternately enabling one of said processing channels to provide said sub-accumulation signal and for clearing and reintializing the other of said processor channels.

12. The device of claim 9 further comprising means for summing the sub-accumulation signals produced by each said subsection to form an output signal substantially equal to the amplitude weighted phase decoded value of a group of said applied encoded signals; and summer control means for connecting said one processing channel of each subsection to said means for summing during said one sequence of alternating sequences of decoding cycles and for connecting said other processing channel of each subsection to said means for summing during said other sequence.

13. A device for consecutively decoding groups of sequentially applied phase encoded signals having $N^2$ signals of N phase encoded states in each group, said device comprising:

- a memory device having an input circuit for receiving said applied signals and having $N + 1$ output circuits;
- N subsections, each subsection coupled between pairs of output circuits of said memory device and including two processing channels, and each channel comprising accumulator means for forming a sub-accumulation signal which approximates the decoded value of one subsequence of N encoded signals, storage means for storing said sub-accumulation signal and multiplier means coupled between the output of said means for storing and the input of said accumulator means for multiplying said stored sub-accumulation signal by a fixed predetermined value; and
- means for selectively controlling the coupling between the output circuits of said memory device associated with each subsection and the channels of each said subsection, and for controlling the coupling between the output of said accumulator means and the input of said storage means in each channel so that each of said channels of each subsection alternately provides said sub-accumulation signal for one sequence of alternating sequences of processing cycles and is alternately cleared and initialized on the next sequence of processing cycles.

14. A device for consecutively decoding groups of sequentially applied phase encoded signals, said device comprising:
- a memory unit having an input circuit for receiving said applied signals and having a plurality of output circuits;
- a plurality of subsections with each subsection coupled between pairs of output circuits of said memory device and including two processing channels with each channel comprising means for forming a sub-accumulator signal that approximates the phase decoded value of one subsequence of said applied phase encoded signals; and
- means for selectively controlling the coupling between the channels of each said subsections and the associated output circuits of said memory device so that one of said processing channels in each subsection provides said sub-accumulation signal during one sequence of alternating sequences of decoding cycles and is cleared and reinitialized during the other sequence of said alternating decoding cycles, and the other channel is cleared and reinitialized during said one sequence and provides said sub-accumulation signal during said other sequence.

15. The device of claim 14 wherein said means for forming said sub-accumulation signal includes accumulator means for forming said sub-accumulation signal in response to input signals applied thereto, storage means for storing said sub-accumulation signal, and multiplier means coupled between the output of said means for storing and one input of said accumulator means for multiplying said stored sub-accumulation signal by a fixed predetermined value; and said means for selectively controlling includes means for coupling the input of said storage means, to either the output of said associated accumulator means or to one of the associated output circuits of said memory device.

16. The device of claim 15 wherein said groups of applied encoded signals are amplitude weighted and phase decoded therein, and said device further comprises applied signal modifying means coupled between said plurality of output circuits of said memory device and said means for selectively controlling, for providing signals to each subsection so that the stored sub-accumulation signal associated with each subsection is modified as a function of the amplitude weighted difference between the applied encoded signal group associated with said stored sub-accumulation signal and a next signal group, to form a new amplitude weighted phase decoded sub-accumulation signal associated with said next signal group.

17. The device of claim 16 wherein said multiplier means includes means for multiplying said stored sub-accumulation signal by a function of the encoded phase of the associated subsequence and of the $N^{th}$ root of a weighting value, where N is the number of signal elements in each subsequence.

18. The device of claim 16 wherein the amplitude weighting is defined by a function approximated by N line segments, each group of encoded signals comprising N subsequences and said fixed predetermined multiplier value associated with said multiplier means in each subsection is a function of the initial phase of the associated subsequence and of the $N^{th}$ root of the ratio of the initial and final value of the associated segment of said weighting function.

19. The device of claim 14 wherein each said group of sequentially applied phase encoded signals comprises $N^2$ signals of N phase encoded states; and said memory device is a shift register having $N^2 + 1$ stages, and $N + 1$ outputs circuits coupled to different stages along said shift register with $N - 1$ stages between adjacent said output circuits.

20. The device of claim 14 wherein each said applied encoded signal has inphase and quadrature signal components; and said memory device, said plurality of subsections, and said means for selectively controlling are dual channel devices adapted for processing inphase and quadrature signal components.

21. A method for consecutively decoding and amplitude weighting groups of sequentially applied signals with each group comprising $N^2$ signals of N phase encoded states and each group differing from the last previously applied group by the addition of a new encoded signal to one end of the group and the deletion of a signal from the other end of the group, said method comprising the steps of:
- forming N sub-accumulation signals such that the value of each sub-accumulation signal approximates the amplitude weighted phase decoded value of a subsequence of N encoded signal of a particular group of encoded signals;
- storing said N sub-accumulation signals; and
- modifying the amplitude and phase of each of said stored sub-accumulation signals as a function of the amplitude weighted and encoded phase difference between the associated subsequence of N encoded signals of said particular group and the next applied group to form a new set of sub-accumulation signals associated with the next group of applied encoded signals.

22. The method of claim 21 further comprising the step of summing said N sub-accumulation signals to form a signal substantially equal to the amplitude weighted phase decoded value of the associated group of encoded signals.

23. The method of claim 21 wherein said storing step comprises alternately storing each sub-accumulation signals in one of two associated storage channels for a first sequence of alternating processing sequences and clearing and reinitializing the other storage channel.

24. A pulse compression system comprising:
- means for transmitting phase encoded pulses of energy;
- means for receiving reflected energy from said transmitted encoded pulses;
- means for sequentially processing said received energy to form a plurality of sub-accumulation signals the sum of which approximates the phase decoded amplitude weighted value of the received energy from a particular range interval;
- means for storing said plurality of sub-accumulation signals; and
- means for modifying said plurality of stored subaccumulation signals associated with said particular range interval to form a new set of sub-accumulation signals the sum of which approximates the phase decoded amplitude weighted value of the energy received from the next range interval.

25. The system of claim 24 wherein:

said transmitting means includes means for encoding N phase states onto $N^2$ signal segments of each transmitted signal;

said storage means includes means for storing N sub-accumulation signals the value of each sub-accumulation signal approximating the amplitude weighted phase decoded value of a subsequence of N received encoded signals; and said modifying means includes means for modifying each said stored signal as a function of the amplitude weighted and encoded phase difference between said signals associated with a particular range interval and the next range interval.

26. The device of claim 25 wherein said means for storing includes two storage channels associated with each sub-accumulation signal and means for storing each of said sub-accumulation signals in one of said associated storage channels for one sequence of alternating processing sequences, for clearing and reinitializing the other storage channel during said one sequence, and for reversing the storage and the clearing, reinitializing channels during the other sequence of said alternating processing sequences.

* * * * *